US010536985B2

(12) United States Patent
Yamazaki et al.

(10) Patent No.: US 10,536,985 B2
(45) Date of Patent: Jan. 14, 2020

(54) MOBILE COMMUNICATION SYSTEM

(71) Applicant: KYOCERA CORPORATION, Kyoto (JP)

(72) Inventors: Chiharu Yamazaki, Tokyo (JP); Kugo Morita, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/669,835

(22) Filed: Aug. 4, 2017

(65) Prior Publication Data

US 2017/0332427 A1 Nov. 16, 2017

Related U.S. Application Data

(62) Division of application No. 14/416,844, filed as application No. PCT/JP2013/069941 on Jul. 23, 2013.

(Continued)

(51) Int. Cl.
*H04W 76/14* (2018.01)
*H04L 5/00* (2006.01)
(Continued)

(52) U.S. Cl.
CPC ............... *H04W 76/14* (2018.02); *H04L 5/00* (2013.01); *H04L 25/0202* (2013.01);
(Continued)

(58) Field of Classification Search
CPC .. H04W 76/023; H04W 8/05; H04L 25/0202; H04L 5/00
See application file for complete search history.

(56) References Cited

U.S. PATENT DOCUMENTS 8,634,869 B2   1/2014 Li et al.
8,953,531 B2 *  2/2015 Oh ..................... H04W 76/14
                                           370/329
(Continued)

FOREIGN PATENT DOCUMENTS

EP      2806673 A1    11/2014
JP   2006-254398 A     9/2006
(Continued)

OTHER PUBLICATIONS

An Office Action issued by the Japanese Patent Office dated Aug. 8, 2017, which corresponds to Japanese Patent Application No. 2016-031857 and is related to U.S. Appl. No. 15/669,835; with English language concise explanation.

(Continued)

*Primary Examiner* — Ian N Moore
*Assistant Examiner* — Latresa A Mccallum
(74) *Attorney, Agent, or Firm* — Studebaker & Brackett PC

(57) ABSTRACT

A communication system, first communication terminal, processor and base station that supports direct communication between terminals comprises a terminal that autonomously selects radio resources to be used in the direct communication, from among the candidate radio resources based on information received from the base station, performs the direct communication by use of the selected radio resources, and detects interference power after receiving the information indicating the candidate radio resources. The terminal transmits information on interference in the candidate radio resources to the base station in response to value of the detected interference power being higher than a threshold value.

5 Claims, 16 Drawing Sheets

Related U.S. Application Data

(60) Provisional application No. 61/759,035, filed on Jan. 31, 2013, provisional application No. 61/759,024, filed on Jan. 31, 2013, provisional application No. 61/705,882, filed on Sep. 26, 2012, provisional application No. 61/676,770, filed on Jul. 27, 2012.

(51) Int. Cl.
*H04W 8/00* (2009.01)
*H04L 25/02* (2006.01)
*H04W 52/24* (2009.01)
*H04W 88/02* (2009.01)
*H04W 88/08* (2009.01)

(52) U.S. Cl.
CPC ......... *H04W 8/005* (2013.01); *H04W 52/243* (2013.01); *H04W 88/02* (2013.01); *H04W 88/08* (2013.01)

(56) References Cited

U.S. PATENT DOCUMENTS

| | | | |
|---|---|---|---|
| 2009/0005094 A1* | 1/2009 | Lee | H04W 52/383 455/509 |
| 2009/0011770 A1 | 1/2009 | Jung et al. | |
| 2010/0069066 A1* | 3/2010 | Shen | H04J 11/0093 455/434 |
| 2010/0165882 A1* | 7/2010 | Palanki | H04W 76/14 370/254 |
| 2011/0106952 A1* | 5/2011 | Doppler | H04W 72/0406 709/226 |
| 2011/0268101 A1 | 11/2011 | Wang et al. | |
| 2011/0275382 A1* | 11/2011 | Hakola | H04W 24/10 455/452.2 |
| 2011/0282989 A1 | 11/2011 | Geirhofer et al. | |
| 2012/0044815 A1 | 2/2012 | Geirhofer et al. | |
| 2012/0052855 A1 | 3/2012 | Soliman et al. | |
| 2012/0184306 A1* | 7/2012 | Zou | H04W 76/14 455/458 |
| 2012/0300662 A1* | 11/2012 | Wang | H04W 72/02 370/252 |
| 2013/0143545 A1 | 6/2013 | Nakao et al. | |
| 2013/0150106 A1* | 6/2013 | Bucknell | H04W 16/14 455/501 |
| 2014/0120934 A1 | 5/2014 | Kishiyama | |

FOREIGN PATENT DOCUMENTS

| | | |
|---|---|---|
| JP | 2009-017560 A | 1/2009 |
| JP | 2010-504051 A | 2/2010 |
| JP | 2013-123222 A | 6/2013 |
| JP | 2013-529032 A | 7/2013 |
| WO | 2010/141911 A2 | 12/2010 |
| WO | 2011/130630 A1 | 10/2011 |
| WO | 2012/015698 A1 | 2/2012 |
| WO | 2012/025952 A1 | 3/2012 |
| WO | 2012/097001 A1 | 7/2012 |
| WO | 2013/002206 A1 | 1/2013 |
| WO | 2013/100831 A1 | 7/2013 |

OTHER PUBLICATIONS

Office Action issued by the Japanese Patent Office dated May 23, 2017, which corresponds to Japanese Patent Application No. 2016-031857 and is related to U.S. Appl. No. 14/416,844 with Concise Statement of Relevance.

An Office Action issued by the Japanese Patent Office dated Oct. 20, 2015, which corresponds to Japanese Patent Application No. 2014-526946 and is related to U.S. Appl. No. 14/416,844, with concise statement of relevance.

Communication pursuant to Rule 164(1) EPC issued by the European Patent Office dated Feb. 12, 2016, which corresponds to European Patent Application No. 13823226.9-1854 and is related to U.S. Appl. No. 14/416,844.

International Search Report issued in PCT/JP2013/069941; dated Oct. 29, 2013.

3rd Generation Partnership Project; Technical Specification Group SA; Feasibility Study for Proximity Services (ProSe); 3GPP TR 22.803 V0.3.0; May, 2012; pp. 1-24; Release 12; 3GPP Organizational Partners.

* cited by examiner

| PUCCH | PUSCH | | | PUCCH | PUCCH | PUCCH | PUCCH | PUCCH | PUCCH |
|---|---|---|---|---|---|---|---|---|---|
| | PUSCH | | | PUSCH | PUSCH | PUSCH | PUSCH | PUSCH | PUSCH |
| | | D2D/Tx | | | | | | | |
| | PUSCH | | | | | | | | |
| | | D2D/Rx | | | | | | | |
| | PUSCH | | | | | | | | |
| PUCCH | PUCCH | PUCCH | PUCCH | PUCCH | PUCCH | PUCCH | PUCCH | PUCCH | PUCCH |
| #0 | | | | | | | | | #9 |

FIG. 19

RESOURCE ASSIGNMENT HISTORY

|  | SUBFRAME #0 | SUBFRAME #1 | SUBFRAME #2 | SUBFRAME #3 |
|---|---|---|---|---|
| UE100-1 | RB#0 | RB#0 | RB#0 | RB#0 |
| UE100-3 | RB#0 | RB#4 | RB#3 | RB#6 | ively couple to the processer. The receiver is configured
MOBILE COMMUNICATION SYSTEM

CROSS REFERENCE TO RELATED APPLICATIONS

This application is a Divisional application of U.S. patent application Ser. No. 14/416,844 filed Jan. 23, 2015, which is the U.S. National Phase Application of International Patent Application No. PCT/JP2013/069941 filed Jul. 23, 2013, which claims benefit of U.S. Provisional Application Nos. 61/676,770 filed Jul. 27, 2012, 61/705,882 filed Sep. 26, 2012, 61/759,024 filed Jan. 31, 2013, 61/759,035 filed Jan. 31, 2013, the entire contents of which are incorporated herein by reference.

TECHNICAL FIELD

The present disclosure relates to a mobile communication system that supports D2D communication.

BACKGROUND ART

In 3GPP (3rd Generation Partnership Project) which is a project aiming to standardize a mobile communication system, the introduction of Device to Device (D2D) communication is discussed as a new function after Release 12 (see a non-patent document 1).

In the D2D communication, a plurality of user terminals adjacent to one another perform direct radio communication in a frequency band assigned to a mobile communication system. In addition, the D2D communication is also called Proximity Service communication.

PRIOR ART DOCUMENT

Non-Patent Document

Non-Patent Document 1: 3GPP technical report "TR 22. 803 V0. 3. 0" May 2012

SUMMARY

In the current specifications, it is problematic that there is no mechanism for appropriately controlling the D2D communication.

Therefore, the present disclosure provides a mobile communication system capable of appropriately controlling D2D communication.

A communication system according to an embodiment includes a first communication terminal, a second communication terminal that is not a communication partner of the first communication terminal, and a base station. The base station transmits information to the first communication terminal and the second communication terminal, where the information indicates candidate radio resources being radio resources available for direct communication between terminals. The first communication terminal autonomously selects radio resources to be used in the direct communication, from among the candidate radio resources, and performs the direct communication by use of the selected radio resources. The second communication terminal autonomously selects radio resources to be used in the direct communication, from among the candidate radio resources, and performs the direct communication by use of the selected radio resources. The first communication terminal detects interference power after receiving the information indicating the candidate radio resources, and transmits information on interference in the candidate radio resources to the base station in response to value of the detected interference power being higher than a threshold value.

A first communication terminal according to an embodiment includes a receiver, a transmitter, and a controller including a processor and a memory configured to communicatively couple to the processer. The receiver is configured to receive information from a base station, where the information indicates candidate radio resources being radio resources available for direct communication between terminals. The controller is configured to autonomously select radio resources to be used in the direct communication, from among the candidate radio resources, perform the direct communication by use of the selected radio resources, and detect interference power after receiving the information indicating the candidate radio resources. The transmitter is configured to transmit information on interference in the candidate radio resources to the base station in response to value of the detected interference power being higher than a threshold value.

A processor for controlling a first communication terminal according to an embodiment is communicatively coupled to a memory. The memory includes instructions such that when executed by the processor performs processes of: receiving information from a base station, where the information indicates candidate radio resources being radio resources available for direct communication between terminals, autonomously selecting radio resources to be used in the direct communication, from among the candidate radio resources, performing the direct communication by use of the selected radio resources, detecting interference power after receiving the information indicating the candidate radio resources, and transmitting information on interference in the candidate radio resources to the base station in response to value of the detected interference power being higher than a threshold value.

A base station according to an embodiment includes a transmitter, a receiver, and a controller including a processor and a memory configured to communicatively couple to the processer. The transmitter is configured to transmit information to a first communication terminal and a second communication terminal, where the information indicates candidate radio resources being radio resources available for direct communication between terminals and used for the first communication terminal and the second communication terminal to autonomously select radio resources to be used in the direct communication, from among the candidate radio resources. The receiver is configured to receive information on interference in the candidate radio resources from the first communication terminal in response to value of interference power being higher than a threshold value, after transmitting the information indicating the candidate radio resources.

BRIEF DESCRIPTION OF THE DRAWINGS

FIG. 9 is a diagram for explaining an example of resource assignment in a first assignment scheme.

FIG. 10 is a diagram for explaining an example of resource assignment in a second assignment scheme.

FIG. 19 is a diagram for explaining a detailed example of a resource assignment history.

DESCRIPTION OF THE EMBODIMENT

Figure 1:
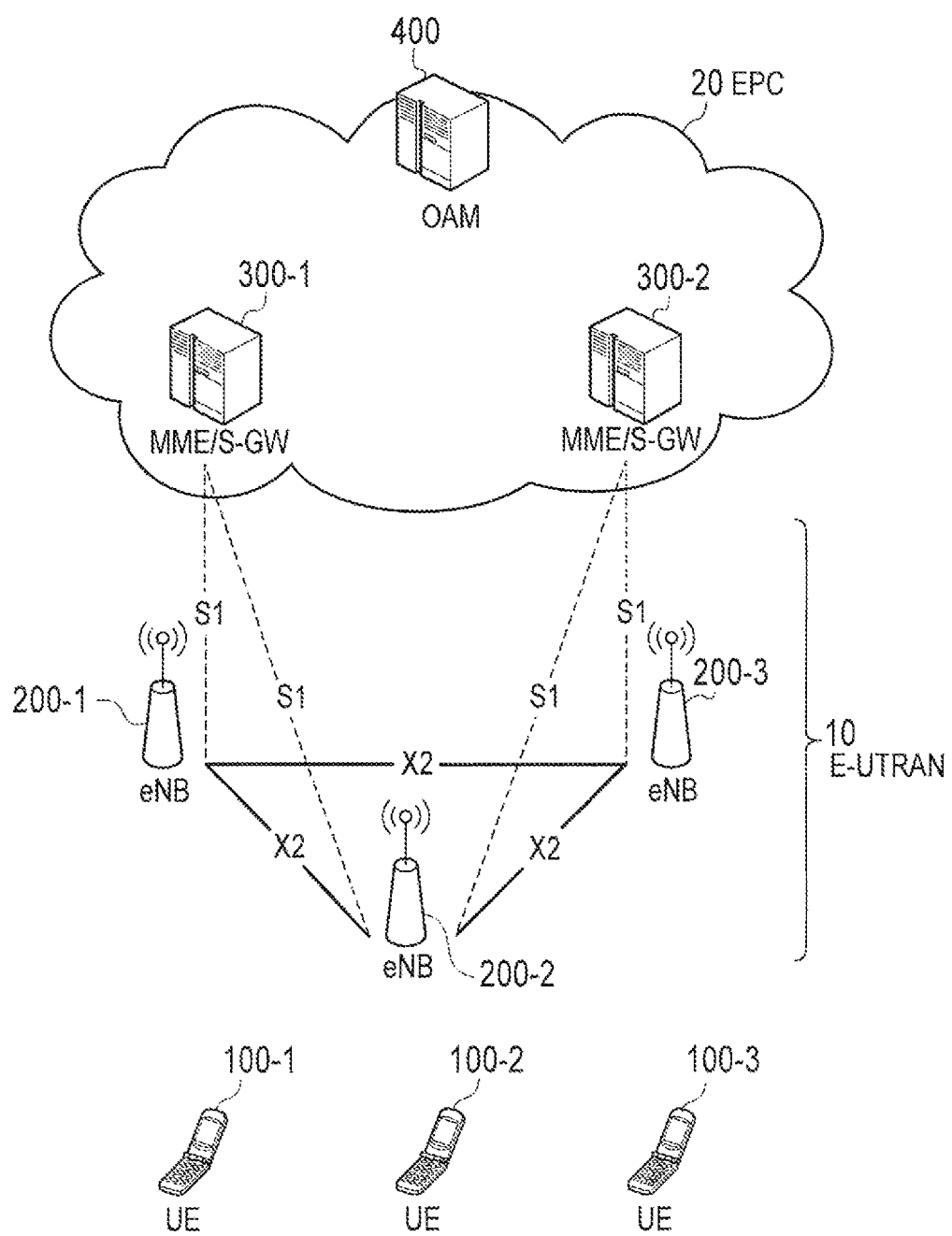
FIG. 1 is a configuration diagram of an LTE system.

[Overview of Embodiments]
[First Embodiment]
(1) Overview of a First Embodiment

A mobile communication system that supports Device to Device (D2D) communication comprises a user terminal that transmits a reference signal for D2D that is used for channel estimation in at least the D2D communication. In addition, a result of the channel estimation, for example, is also used for demodulation/decoding of a signal, and channel information feedback. That is, the reference signal for D2D is further used for demodulation/decoding of a signal, and channel information feedback.

As described above, the mobile communication system according to the present embodiment newly defines the reference signal for D2D that is used for the channel estimation in the D2D communication. A general reference signal is introduced to cellular communication (communication between a base station and a user terminal) in a mobile communication system. However, in the present embodiment, such a reference signal is introduced to the D2D communication.

The reference signal for D2D is further used for discovering another user terminal to be a communication partner of the D2D communication. The "discovering of the other user terminal" is a concept including both that a user terminal discovers the other user terminal and that the user terminal is discovered by the other user terminal.

As described above, in the present embodiment, the reference signal for D2D is also used for discovering the other user terminal. In other words, the reference signal for D2D is made to be common to a beacon signal for discovering the other user terminal. In this way, as compared with the case of defining the beacon signal separately from the reference signal for D2D, it is possible to save a radio resource.

A reference signal parameter, which differs in each D2D group composed of a plurality of user terminals that perform the D2D communication, may be applied to the reference signal for D2D. In this way, a user terminal which has received the reference signal for D2D is able to identity a D2D group to which a user terminal having transmitted the reference signal for D2D belongs.

The reference signal parameter may be determined in response to designation from a base station. In this way, it is possible to appropriately assign the reference signal parameter under the control of the base station, and to allow the reference signal parameter to differ in each D2D group.

The reference signal for D2D may be transmitted by using a resource element common in each of the D2D groups, and the reference signal parameter may be an orthogonal code for performing code division multiplexing on the reference signal for D2D. In this way, when code division multiplexing is thus performed on the reference signal for D2D by using an orthogonal code different depending on each D2D group, it is possible to save a radio resource (a resource element).

In the case in which the reference signal for D2D is transmitted within an uplink frequency band of the mobile communication system, the reference signal for D2D may be arranged while avoiding a physical uplink control channel, a demodulation reference signal, and a sounding reference signal within the uplink frequency band. This makes it possible to reduce an adverse influence of the reference signal for D2D to cellular communication (uplink communication), so that it is possible to contribute to the co-existence of the D2D communication and the cellular communication.

In the case in which the reference signal for D2D is transmitted within a downlink frequency band of the mobile communication system, the reference signal for D2D may be arranged while avoiding a physical downlink control channel and a cell-specific reference signal within the downlink frequency band. This makes it possible to reduce an adverse influence of the reference signal for D2D to cellular communication (downlink communication), so that it is possible to contribute to the co-existence of the D2D communication and the cellular communication.

In the case in which the reference signal for D2D is transmitted within the uplink frequency band of the mobile communication system, the reference signal for D2D may be further used for detecting interference to the uplink communication of the mobile communication system from the D2D communication. In this way, even though the reference signal for D2D applies interference to the cellular communication (the uplink communication), it is possible to take measures for removing the interference.

In response to a reception level of the reference signal for D2D from the user terminal being higher than a threshold value, the base station may transmit switching information for switching the D2D communication to the cellular communication to the user terminal.

In response to a reception level of the reference signal for D2D from the user terminal being higher than a threshold value, the base station may perform scheduling such that a radio resource is not shared between the D2D communication and the uplink.

In response to a reception level of the reference signal for D2D from the user terminal being higher than a threshold value, the base station may transmit power control information for reducing transmission power in the D2D communication to the user terminal.

In response to a reception level of the reference signal for D2D from the user terminal being higher than a threshold value, the base station may transmit power control information for increasing transmission power in the uplink or MCS control information for reducing MCS in the uplink to a cellular communication terminal to which a radio resource shared with the user terminal is assigned.

The user terminal may perform multi-antenna transmission in the D2D communication, and in response to the base station detecting the reference signal for D2D from the user terminal, the base station may transmit, to the user terminal, setting information for setting an antenna weight by which interference applied to the base station is reduced.

A user terminal according to the embodiments is a user terminal in a mobile communication system that supports Device to Device (D2D) communication. The user terminal comprises: a transmission unit that transmits a reference signal for D2D that is used for channel estimation in at least the D2D communication. The reference signal for D2D is further used for discovering another user terminal to be a communication partner of the D2D communication.

A processor according to the embodiments is a processor provided in a user terminal in a mobile communication system that supports Device to Device (D2D) communication. The processor executes a process of transmitting a reference signal for D2D used for channel estimation in at least the D2D communication. The reference signal for D2D is further used for discovering another user terminal to be a communication partner of the D2D communication.

A base station according to the embodiments is a base station in a mobile communication system that supports Device to Device (D2D) communication. The base station designates a reference signal parameter to a user terminal that transmits a reference signal for D2D to which the reference signal parameter different depending on each D2D group composed of a plurality of user terminals performing the D2D communication is applied.

A mobile communication system according to the embodiments supports cellular communication in which data communication is performed between a network and a user terminal and D2D communication in which data communication is directly performed among two or more user terminals. The mobile communication system comprises: a D2D communication terminal that is a user terminal which performs the D2D communication; and a base station that assigns a radio resource to be used in the D2D communication to the D2D communication terminal. In response to detection of interference power, the D2D communication terminal transmits interference information on interference to the base station. In this way, the base station is able to recognize the generation of the interference which the D2D communication terminal receives (particularly, interference from the cellular communication), and to take measures for solving the interference. Thus, the D2D communication can be appropriately controlled.

The D2D communication terminal may transmit the interference information to the base station when a value of the interference power is higher than a threshold value. In this way, it is possible to ensure that the base station is notified of the generation of high level of interference and the base station is not notified of non-problematic level of interference.

The threshold value may be designated from the base station. In this way, the base station is able to control a transmission trigger of the interference information.

The D2D communication terminal may transmit the interference information to the base station at the timing after a predetermined time lapses from the detection timing of the interference power. The interference information may be information indicating that the terminal has received interference. Furthermore, the base station may manage the history of radio resource assignment. When the base station receives the interference information from the D2D communication terminal, the base station may estimate a user terminal being an interference source on the basis of the reception timing of the interference information and the history. In this way, the base station is able to designate the interference generation timing from the reception timing of the interference information, and to estimate a user terminal being an interference source from the history of the radio resource assignment at the interference generation timing. Consequently, it is possible to take measures for solving the interference.

Alternatively, the interference information may include timing information indicating the detection timing of the interference power. The base station manages the history of the radio resource assignment. When the base station receives the interference information from the D2D communication terminal, the base station may estimate a user terminal being an interference source on the basis of the timing information included in the interference information and the history. In this way, the base station is able to estimate the user terminal being the interference source from the history of the radio resource assignment corresponding to the interference generation timing. Consequently, it is possible to take measures for solving the interference.

The interference information may include information indicating a frequency at which the interference power was detected. In this way, it is possible to improve the accuracy for estimating the user terminal being the interference source.

A radio resource shared with the cellular communication may be assigned to the D2D communication terminal as a radio resource to be used in the D2D communication. In this way, it is possible to improve the use efficiency of a radio resource.

The D2D communication terminal may detect the interference power for a reference signal in an uplink of the cellular communication. In this way, it is possible to more reliably detect the interference from the cellular communication. In this case, the interference information may also include information indicating a signal sequence of the reference signal or information generated from the signal sequence of the reference signal. In this way, it is possible to improve the accuracy for estimating the user terminal being the interference source.

In response to the reception of the interference information from the D2D communication terminal, the base station may transmit switching information for switching the D2D communication to the cellular communication to the D2D communication terminal.

In response to the reception of the interference information from the D2D communication terminal, the base station may allow a radio resource to be assigned to the D2D communication terminal to differ from a radio resource to be assigned to a cellular communication terminal that is being an interference source.

In response to the reception of the interference information from the D2D communication terminal, the base station may transmit, to the D2D communication terminal, power control information for increasing transmission power in the D2D communication or MCS control information for reducing MCS in the D2D communication.

In response to the reception of the interference information from the D2D communication terminal, the base station may transmit power control information for reducing uplink transmission power to a cellular communication terminal being an interference source.

When a cellular communication terminal being an interference source performs multi-antenna transmission in an uplink, the base station may transmit, to the cellular communication terminal being the interference source, setting information for setting an antenna weight, by which interference applied to the D2D communication is reduced, in response to the reception of the interference information from the D2D communication terminal.

In response to the detection of the interference power from another D2D communication terminal, which is not a communication partner of the D2D communication terminal, the D2D communication terminal may transmit the interference information to the base station.

The D2D communication terminal may detect the interference power for a reference signal for the D2D communication and/or a beacon signal for the D2D communication. In this case, the interference information may also include information indicating a signal sequence of the reference signal or information generated from the signal sequence of the reference signal.

In response to the reception of the interference information from the D2D communication terminal, the base station may transmit switching information for switching the D2D communication to the cellular communication to the D2D communication terminal or the other D2D communication terminal.

In response to the reception of the interference information from the D2D communication terminal, the base station may allow a radio resource to be assigned to the D2D communication terminal to differ from that to be assigned to the other D2D communication terminal.

In response to the reception of the interference information from the D2D communication terminal, the base station may transmit, to the D2D communication terminal and/or the other D2D communication terminal, power control information for reducing transmission power or MCS control information for reducing MCS.

In response to the reception of the interference information from the D2D communication terminal, the base station may transmit, to the D2D communication terminal and/or the other D2D communication terminal, setting information for setting an antenna weight by which interference is reduced.

In a user terminal according to the embodiments, a radio resource used in D2D communication is assigned from a base station in a mobile communication system that supports cellular communication in which data communication is performed between a network and a user terminal and D2D communication in which data communication is directly performed among two or more user terminals. The user terminal comprises: a control unit that transmits interference information on interference to the base station in response to detection of interference power.

A base station according to the embodiments is a base station in a mobile communication system, which supports cellular communication in which data communication is performed between a network and a user terminal and D2D communication in which data communication is directly performed among two or more user terminals. The base station comprises: a control unit that assigns a radio resource to be used in the D2D communication to a D2D communication terminal being a user terminal that performs the D2D communication; and a reception unit that receives, from the D2D communication terminal, interference information indicating that the D2D communication terminal has detected interference power.

A processor is provided in a user terminal in which a radio resource used in D2D communication is assigned from a base station in a mobile communication system that supports the cellular communication in which data communication is performed between a network and a user terminal and the D2D communication in which data communication is directly performed among two or more user terminals. The processor performs a process of transmitting interference information on interference to the base station in response to detection of interference power.

A processor is provided in a base station in a mobile communication system that supports cellular communication in which data communication is performed between a network and a user terminal and D2D communication in which data communication is directly performed among two or more user terminals. The processor performs: a process of assigning a radio resource to be used in the D2D communication to a D2D communication terminal being a user terminal that performs the D2D communication; and a process of receiving, from the D2D communication terminal, interference information indicating that the D2D communication terminal has detected interference power.

Hereinafter, with reference to the drawings, a description will be provided for an embodiment when the D2D communication is introduced to a cellular mobile communication system (hereinafter, an "LTE system") configured to conform to the 3GPP standards.

(2) LTE System

FIG. 1 is a configuration diagram of an LTE system according to the present embodiment.

As illustrated in FIG. 1, the LTE system includes a plurality of UEs (User Equipments) 100, E-UTRAN (Evolved-UMTS Terrestrial Radio Access Network) 10, and EPC (Evolved Packet Core) 20. The E-UTRAN 10 and the EPC 20 constitute a network.

The UE 100 is a mobile radio communication device and performs radio communication with a cell (a serving cell) with which a connection is established. The UE 100 corresponds to the user terminal.

The E-UTRAN 10 includes a plurality of eNBs 200 (evolved Node-Bs). The eNB 200 corresponds to a base station. The eNB 200 controls a cell and performs radio communication with the UE 100 that establishes a connection with the cell.

In addition, the "cell" is used as a term indicating a minimum unit of a radio communication area, and is also used as a function of performing radio communication with the UE 100.

The eNB 200, for example, has a radio resource management (RRM) function, a routing function of user data, and a measurement control function for mobility control and scheduling.

The EPC 20 includes MMEs (Mobility management Entities)/S-GWs (Serving-Gateways) 300, and OAM (Operation and Maintenance) 400.

The MME is a network node for performing various mobility controls, etc., for the UE 100 and corresponds to a controller. The S-GW is a network node that performs transfer control of user data and corresponds to a mobile switching center.

The eNBs 200 are connected mutually via an X2 interface. Furthermore, the eNB 200 is connected to the MME/S-GW 300 via an S1 interface.

The OAM 400 is a server device managed by an operator and performs maintenance and monitoring of the E-UTRAN 10.

Next, the configurations of the UE 100 and the eNB 200 will be described.

Figure 2:
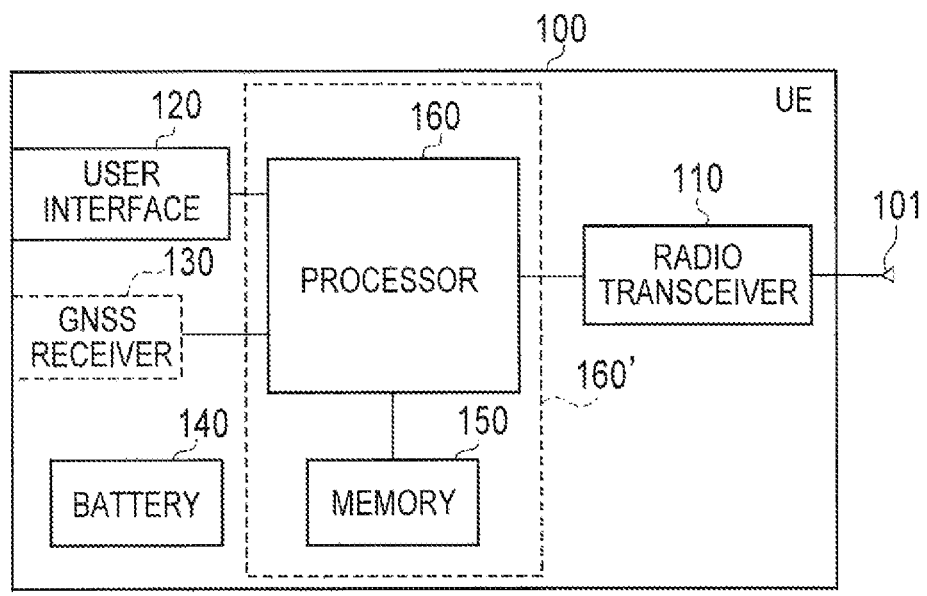
FIG. 2 is a block diagram of UE.

FIG. 2 is a block diagram of the UE 100. As illustrated in FIG. 2, the UE 100 includes an antenna 101, a radio transceiver 110, a user interface 120, a GNSS (Global Navigation Satellite System) receiver 130, a battery 140, a memory 150, and a processor 160. The memory 150 and the processor 160 constitute a control unit.

The UE 100 may not have the GNSS receiver 130. In addition, the memory 150 is integrated with the processor 160, and this set (that is, a chipset) may be called a processor 160'.

The antenna 101 and the radio transceiver 110 correspond to a part of a layer 1 and are used to transmit and receive a radio signal. The antenna 101 includes a plurality of antenna elements. The radio transceiver 110 converts a baseband signal output from the processor 160 into the radio signal, and transmits the radio signal from the antenna 101. Furthermore, the radio transceiver 110 converts the radio signal received by the antenna 101 into the baseband signal, and outputs the baseband signal to the processor 160.

The user interface 120 is an interface with a user carrying the UE 100, and includes, for example, a display, a microphone, a speaker, and various buttons. The user interface 120 receives an operation from a user and outputs a signal indicating the content of the operation to the processor 160.

The GNSS receiver 130 receives a GNSS signal in order to obtain location information indicating a geographical location of the UE 100, and outputs the received signal to the processor 160.

The battery 140 accumulates a power to be supplied to each block of the UE 100.

The memory 150 stores a program to be executed by the processor 160 and information to be used for a process by the processor 160.

The processor 160 includes a baseband processor configured to perform modulation and demodulation, coding and decoding and the like of the baseband signal, and a CPU (Central Processing Unit) configured to perform various processes by executing the program stored in the memory 150. The processor 160 may further include a codec that performs encoding and decoding of sound and video signals.

The processor 160, for example, executes various processes and executes various communication protocols which will be described later. Details of a process performed by the processor 160 will be described below.

Figure 3:
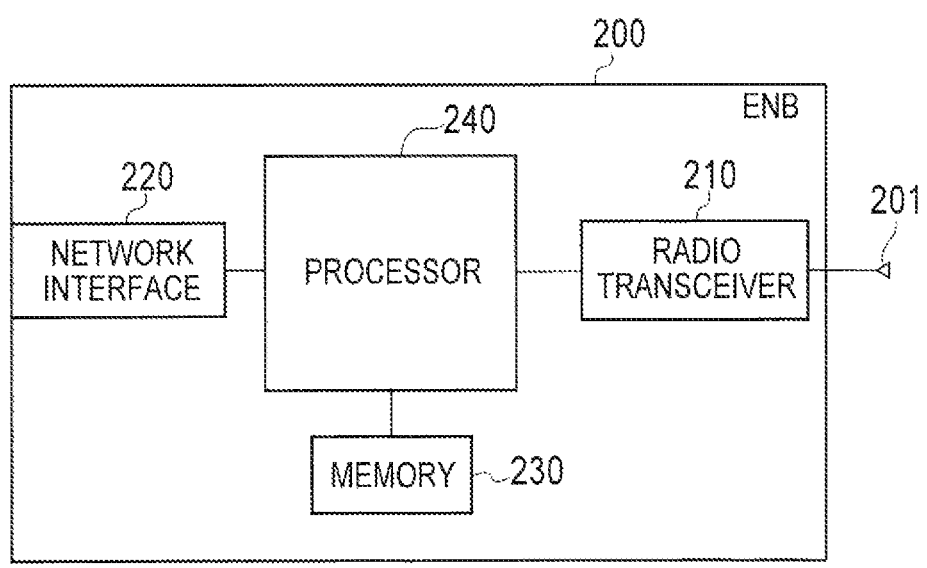
FIG. 3 is a block diagram of eNB.

FIG. 3 is a block diagram of the eNB 200. As illustrated in FIG. 3, the eNB 200 includes an antenna 201, a radio transceiver 210, a network interface 220, a memory 230, and a processor 240. The memory 230 and the processor 240 constitute the control unit.

The antenna 201 and the radio transceiver 210 correspond to a part of a layer 1 and are used to transmit and receive the radio signal. The antenna 201 includes a plurality of antenna elements. The radio transceiver 210 converts the baseband signal output from the processor 240 into the radio signal, and transmits the radio signal from the antenna 201. Furthermore, the radio transceiver 210 converts the radio signal received by the antenna 201 into the baseband signal, and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240.

The processor 240 includes the baseband processor that performs modulation and demodulation, and encoding and decoding of the baseband signal and a CPU that perform various processes by executing the program stored in the memory 230.

The processor 240, for example, executes various processes and executes various communication protocols which will be described later. Details of a process performed by the processor 240 will be described below.

Figure 4:
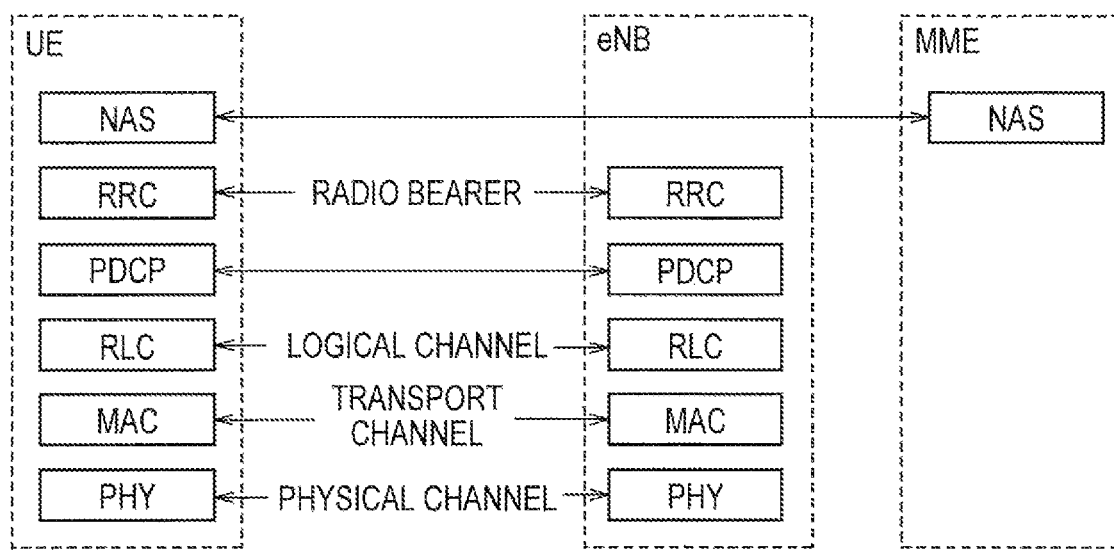
FIG. 4 is a protocol stack diagram of a radio interface in the LTE system.

FIG. 4 is a protocol stack diagram of a radio interface in the LTE system.

As illustrated in FIG. 4, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. The PHY layer provides a transmission service to an upper layer by using a physical channel. Between the PHY layer of the UE 100 and the PHY layer of the eNB 200, data is transmitted through the physical channel.

The MAC layer performs preferential control of data, and a retransmission process and the like by hybrid ARQ (HARQ). Between the MAC layer of the UE 100 and the MAC layer of the eNB 200, data is transmitted through a transport channel. The MAC layer of the eNB 200 includes a transport format of an uplink and a downlink (a transport block size, a modulation and coding scheme, and the like) and a MAC scheduler for determining a resource block to be assigned.

The RLC layer transmits data to an RLC layer of a reception side by using the functions of the MAC layer and the PHY layer. Between the RLC layer of the UE 100 and the RLC layer of the eNB 200, data is transmitted through a logical channel.

The PDCP layer performs header compression and decompression, and encryption and decryption.

The RRC layer is defined only in a control plane. Between the RRC layer of the UE 100 and the RRC layer of the eNB 200, a control signal (an RRC message) for various types of setting is transmitted. The RRC layer controls the logical channel, the transport channel, and the physical channel in response to establishment, re-establishment, and release of a radio bearer. When an RRC connection is established between the RRC of the UE 100 and the RRC of the eNB 200, the UE 100 is in a connected state, and when the RRC connection is not established, the UE 100 is in an idle state.

A NAS (Non-Access Stratum) layer positioned above the RRC layer performs session management or mobility management, for example.

Figure 5:
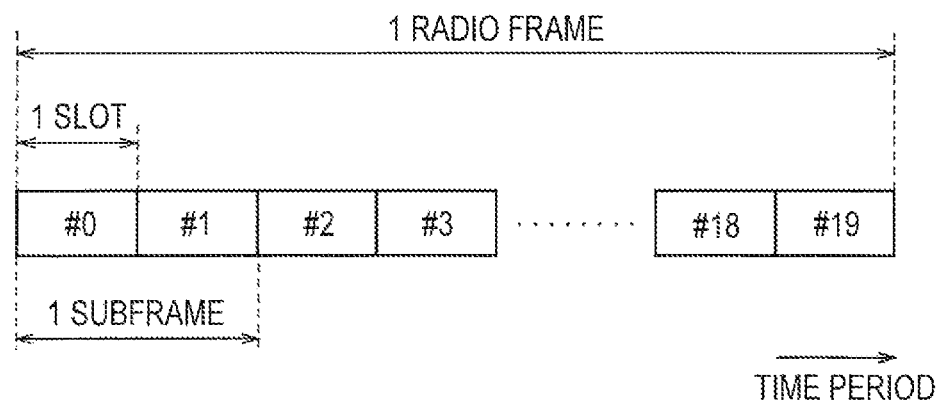
FIG. 5 is a configuration diagram of a radio frame used in the LTE system.

FIG. 5 is a configuration diagram of a radio frame used in the LTE system. In the LTE system, OFDMA (Orthogonal Frequency Division Multiplexing Access) is employed in a downlink, and SC-FDMA (Single Carrier Frequency Division Multiple Access) is employed in an uplink, respectively.

As illustrated in FIG. 5, the radio frame is configured by 10 subframes arranged in a time-period direction, wherein each subframe is configured by two slots arranged in the time-period direction. Each subframe has a length of 1 ms and each slot has a length of 0.5 ms. Each subframe includes a plurality of resource blocks (RBs) in a frequency direction, and a plurality of symbols in the time-period direction. Each symbol is provided at a head thereof with a guard interval called a cyclic prefix (CP). The resource block includes a plurality of subcarriers in the frequency direction. A radio resource unit configured by one subcarrier and one symbol is called a resource element (RE).

Among radio resources assigned to the UE 100, a frequency resource is designated by a resource block and a time resource is designated by a subframe. That is, the radio resource assigned to the UE 100 is designated by a combination of the resource block and the subframe.

In the downlink, an interval of several symbols at the head of each subframe is a control region mainly used as a physical downlink control channel (PDCCH). Furthermore, the remaining interval of each subframe is a region mainly used as a physical downlink shared channel (PDSCH). Moreover, in each subframe, cell-specific reference signals (CRSs) are distributed and arranged.

In the uplink, both ends in the frequency direction of each subframe are control regions mainly used as a physical uplink control channel (PUCCH). Furthermore, the center portion in the frequency direction of each subframe is a region mainly used as a physical uplink shared channel (PUSCH). Moreover, in each subframe, a demodulation reference signal (DMRS) and a sounding reference signal (SRS) are arranged. Specifically, the demodulation reference signal is arranged at a fourth symbol of each slot in the case of a normal CP and is arranged at a third symbol of each slot in the case of an extended CP. The sounding reference signal is arranged at a final symbol of a subframe.

In the present embodiment, the reference signal for D2D is further arranged in the subframe. Details of the reference signal for D2D will be described later.

Figure 6:
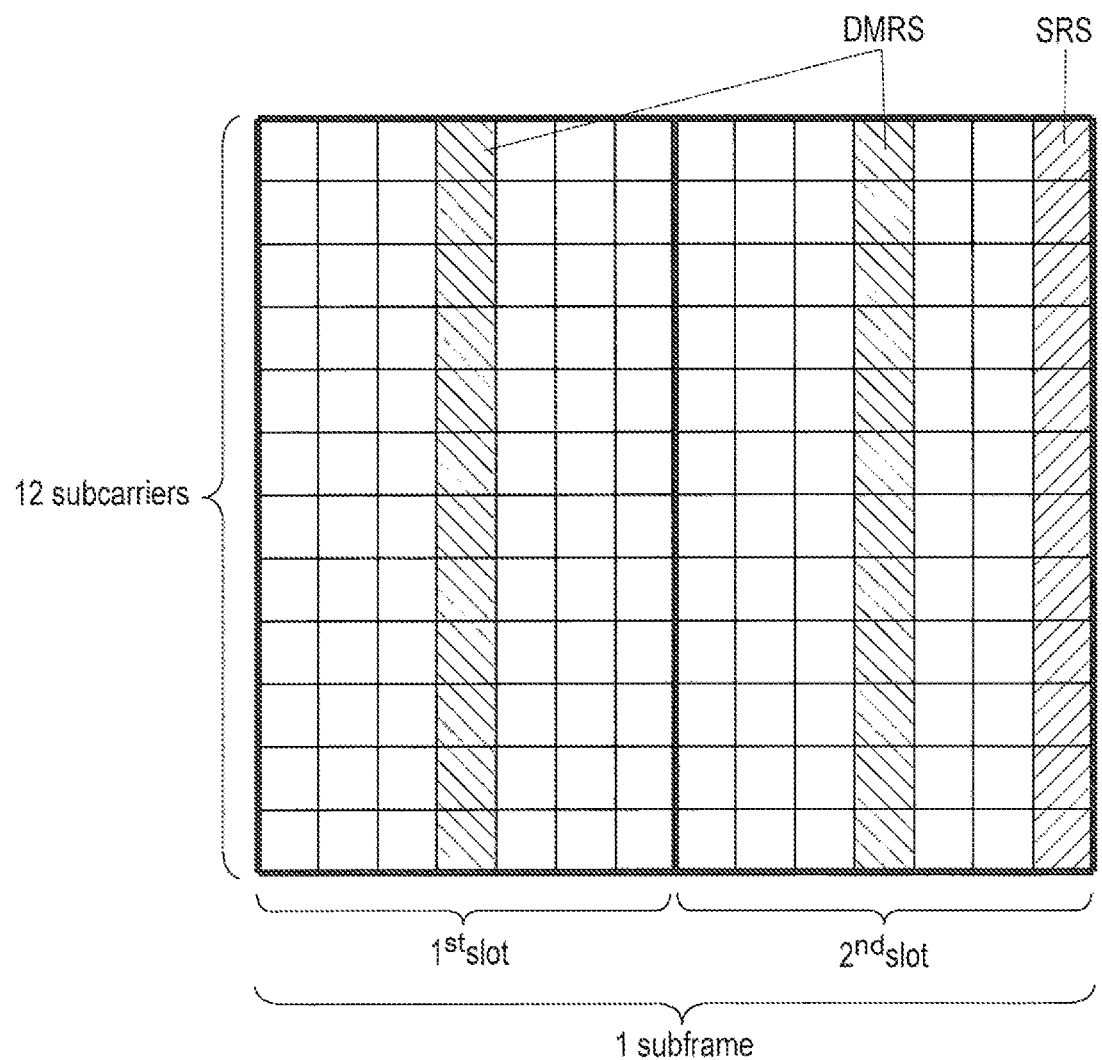
FIG. 6 is a diagram for explaining a DMRS resource and an SRS resource.

FIG. 6 is a diagram for explaining a radio resource (a DMRS resource) in which DMRS is arranged and a radio resource (an SRS resource) in which SRS is arranged.

As illustrated in FIG. 6, the DMRS resource is arranged at the fourth symbol of each slot in the case of normal CP while being arranged at the third symbol of each slot in the case of extended CP. The SRS resource is arranged at the final symbol of a subframe.

(3) D2D Communication

Next, the D2D communication will be described with comparing the normal communication (the cellular communication) in the LTE system.

Figure 7:
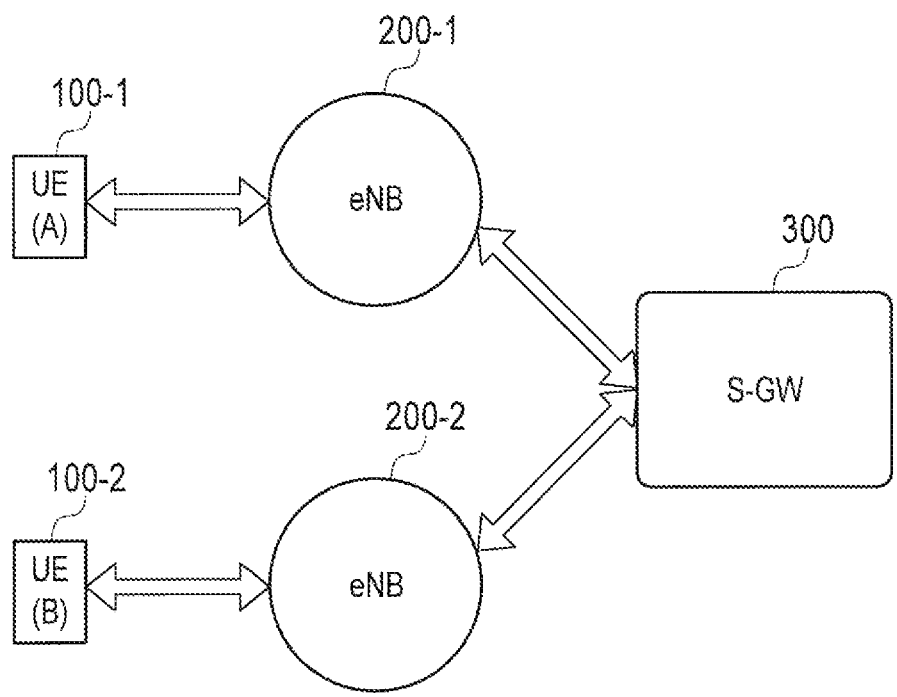
FIG. 7 illustrates a data path in cellular communication.

FIG. 7 illustrates a data path in the cellular communication. FIG. 7 illustrates the case in which the cellular communication is performed between UE 100-1 that establishes a connection with eNB 200-1 and UE 100-2 that establishes a connection with eNB 200-2. In addition, the data path indicates a transfer path of user data (a user plane).

As illustrated in FIG. 7, the data path of the cellular communication passes through the network. Specifically, the data path is set to pass through the eNB 200-1, the S-GW 300, and the eNB 200-2.

Figure 8:
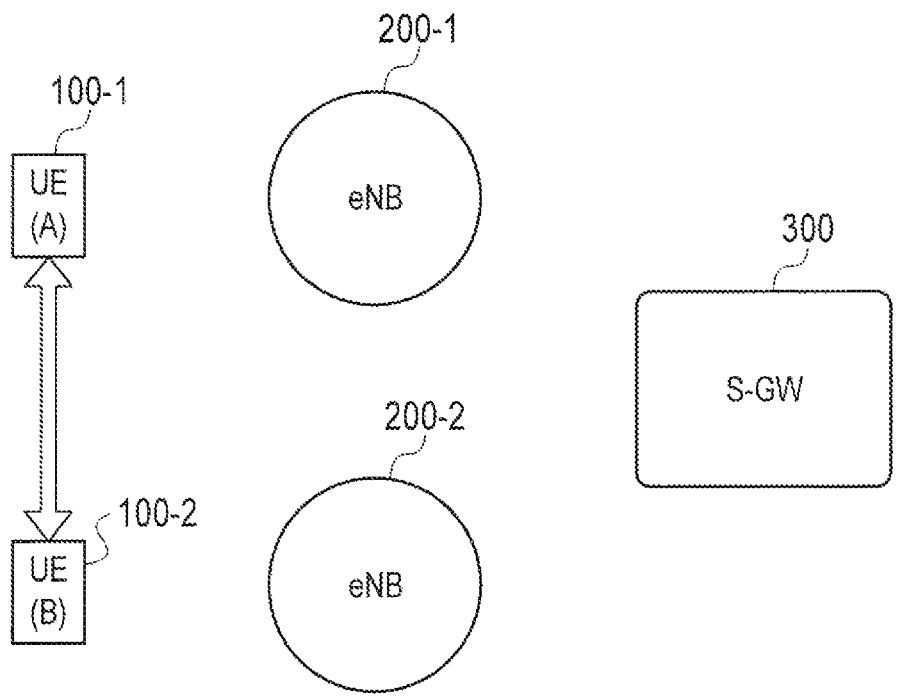
FIG. 8 illustrates a data path in D2D communication.

FIG. 8 illustrates a data path in the D2D communication. FIG. 8 illustrates the case in which the D2D communication is performed between the UE 100-1 that establishes a connection with the eNB 200-1 and the UE 100-2 that establishes a connection with the eNB 200-2. In this case, the UE 100-1 and the UE 100-2 constitute a D2D group.

For example, one UE 100 of the UE 100-1 and the UE 100-2 discovers the other UE 100 existing in the vicinity of the one UE 100, so that the D2D communication starts. In addition, in order to start the D2D communication, the UE 100 has a (Discover) function of discovering the other UE 100 existing in the vicinity of the UE 100. Furthermore, the UE 100 has a (Discoverable) function discovered by the other UE 100.

As illustrated in FIG. 8, the data path of the D2D communication does not pass through the network. That is, direct radio communication is performed between the UEs. As described above, when the UE 100-2 exists in the vicinity of the UE 100-1, the D2D communication is performed between the UE 100-1 and the UE 100-2, thereby obtaining an effect that a traffic load of the network and a battery consumption amount of the UE 100 are reduced, for example.

Furthermore, the D2D communication is considered to be performed in a frequency band of the LTE system (more specifically, in a frequency band of the cellular communication), and for example, in order to avoid interference to the cellular communication, the D2D communication is performed under the control of the network (eNB 200). A radio resource assignment scheme for the D2D communication mainly includes the following two schemes.

According to the first assignment scheme, the UE 100 is able to select a radio resource to be used in the D2D communication. Specifically, the eNB 200 transmits, to the UE 100, information indicating assignment candidate radio resources that are radio resources available for the D2D communication. The UE 100 autonomously selects a radio resource to be used in the D2D communication from the assignment candidate radio resources.

Figure 9:
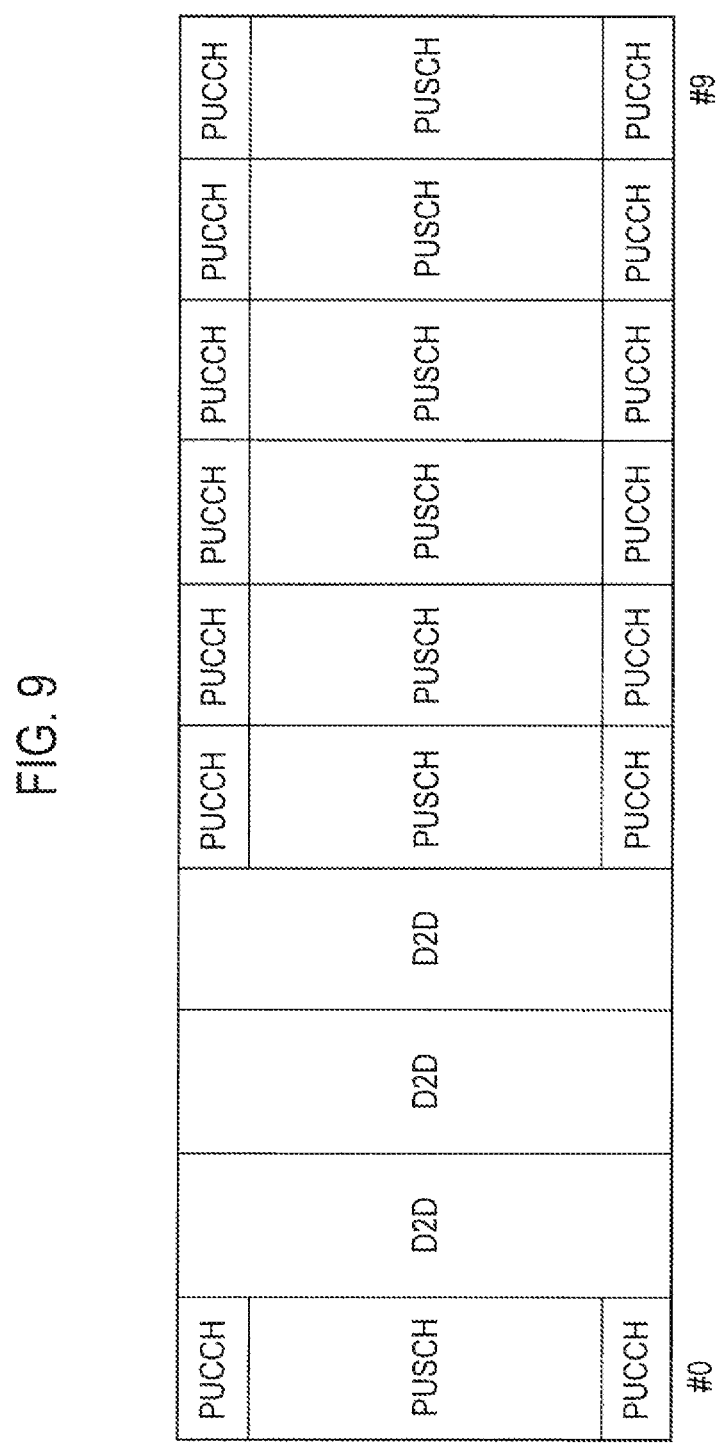

FIG. 9 is a diagram for explaining an example of resource assignment in the first assignment scheme. In this case, considered in the case in which the D2D communication is performed in an uplink frequency band.

As illustrated in FIG. 9, the eNB 200 designates a specific subframe as an assignment candidate radio resource that is a radio resource available for the D2D communication. In the example in FIG. 9, subframes from a second subframe (a subframe #1) to a fourth subframe (a subframe #3) within the radio frame are designated as assignment candidate radio resources. The UE 100, which is to perform the D2D communication, selects resource blocks and subframes to be used in the D2D communication from the assignment candidate radio resources.

According to the second assignment scheme, the eNB 200 determines a radio resource to be used in the D2D communication. That is, the UE 100 has no selection right of the radio resource to be used in the D2D communication. Specifically, the eNB 200 transmits, to the UE 100, information indicating a radio resource dynamically or quasi-statically assigned for the D2D communication. The UE 100 performs the D2D communication by using the assigned radio resource.

FIG. 10 is a diagram for explaining an example of resource assignment in the second assignment scheme. In this case, considered in the case in which the D2D communication is performed in an uplink frequency band.

As illustrated in FIG. 10, the eNB 200 designates a specific resource block of a specific subframe as an assignment radio resource to be used in the D2D communication. In the example in FIG. 10, a part of resource blocks in a second subframe (a subframe #1) and a part of resource blocks in a fourth subframe (a subframe #3) within the radio frame are designated as assignment radio resources. The UE 100, which is to perform the D2D communication, performs the D2D communication by using a radio resource assigned from the eNB 200.

In addition, transmission (Tx) in the second subframe (the subframe #1) indicates transmission in one UE 100 in a D2D group, and the other UE 100 performs reception (Rx). Reception (Rx) in the fourth subframe (the subframe #3) indicates reception in one UE 100 in the D2D group, and the other UE 100 performs transmission (Tx).

(4) Operation

Hereinafter, the operation according to the embodiment will be described.

(4.1) Reference Signal for D2D

The present embodiment newly defines the reference signal for D2D that is used for the channel estimation in the D2D communication.

The reference signal for D2D is further used for discovering another UE 100 that should be a communication partner of the D2D communication. The "discovering of the other UE 100" is a concept including both that the UE 100 discovers the other UE 100 and that the UE 100 is discovered by the other UE 100. However, in the present embodiment, the reference signal for D2D is used when the UE 100 is discovered by the other UE 100.

Figure 11:
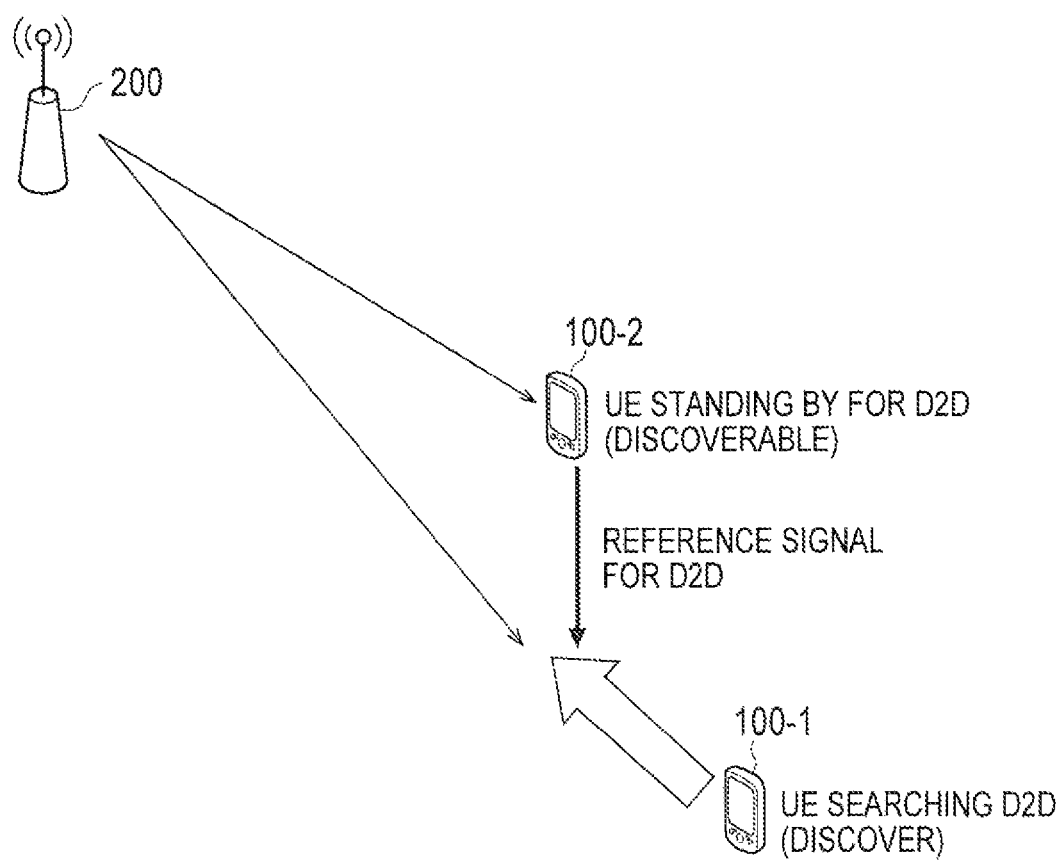
FIG. 11 is a diagram for explaining an operation related to the start of the D2D communication according to a first embodiment.

FIG. 11 is a diagram for explaining an operation related to the start of the D2D communication.

As illustrated in FIG. 11, firstly, the UE 100-2 starts to transmit the reference signal for D2D when desiring to start the D2D communication. After starting to transmit the reference signal for D2D, the UE 100-2 periodically transmits the reference signal for D2D.

A reference signal parameter, which differs in each D2D group, is applied to the reference signal for D2D. In this way, the UE 100-1 which has received the reference signal for D2D is able to identity a D2D group to which the UE 100-2 having transmitted the reference signal for D2D belongs.

The reference signal parameter is designated from the eNB 200. In this way, it is possible to appropriately assign the reference signal parameter under the control of the eNB 200, so that it is possible to allow the reference signal parameter to differ in each D2D group.

The reference signal for D2D may be transmitted using a resource element common in each of the D2D groups. In this case, the reference signal parameter, for example, may be an orthogonal code for performing code division multiplexing on the reference signal for D2D. In this way, when code division multiplexing is thus performed on the reference signal for D2D by using an orthogonal code different depending on each D2D group, it is possible to save a radio resource (a resource element).

In addition, when a resource element, in which the reference signal for D2D is arranged, is allowed to differ in each D2D group, the resource element corresponds to the reference signal parameter. Alternatively, when a subframe, in which the reference signal for D2D is arranged, is differed in each D2D group, the subframe corresponds to the reference signal parameter.

In the case in which the reference signal for D2D is transmitted within the uplink frequency band of the LTE system, the reference signal for D2D may be arranged while avoiding a physical uplink control channel (PUCCH), a demodulation reference signal (DMRS), and a sounding reference signal (SRS) within the uplink frequency band. This makes it possible to reduce an adverse influence of the reference signal for D2D to cellular communication (uplink communication), so that it is possible to contribute to the co-existence of the D2D communication and the cellular communication.

Alternatively, in the case in which the reference signal for D2D is transmitted within the downlink frequency band of the LTE system, the reference signal for D2D may be arranged while avoiding a physical downlink control channel (PDCCH) and a cell-specific reference signal (CRS) within the downlink frequency band. This makes it possible to reduce an adverse influence of the reference signal for D2D to cellular communication (downlink communication), so that it is possible to contribute to the co-existence of the D2D communication and the cellular communication.

Secondly, the UE 100-1 attempts to receive the reference signal for D2D when desiring to start the D2D communication. That is, the UE 100-1 monitors the reference signal for D2D. The UE 100-1 discovers the UE 100-2 in response to the reception of the reference signal for D2D from the UE 100-2.

Thirdly, after the UE 100-1 discovers the UE 100-2, the D2D communication is started between the UE 100-1 and the UE 100-2 by using a radio resource notified from the eNB 200. The UE 100-2 continues the periodical transmission of the reference signal for D2D even after starting the D2D communication.

Furthermore, after starting the D2D communication, the UE 100-2 may shorten a transmission cycle of the reference signal for D2D, as compared with before the D2D communication is started, in order to appropriately perform channel estimation. For example, before the D2D communication is started, the reference signal for D2D may be transmitted at an interval of a plurality of subframes, and after the D2D communication is started, the reference signal for D2D may be transmitted in each subframe.

Furthermore, when starting the D2D communication, the UE 100-1 starts to transmit the reference signal for D2D.

Fourthly, after the D2D communication is started, the UE 100-1 performs channel estimation for estimating channel characteristics between the UE 100-1 and the UE 100-2 by using the reference signal for D2D received from the UE 100-2. Then, when user data is received from the UE 100-2, the UE 100-1 performs demodulation/decoding of the user data on the basis of the channel characteristics estimated by the channel estimation.

Similarly, after the D2D communication is started, the UE 100-2 performs channel estimation for estimating channel characteristics between the UE 100-2 and the UE 100-1 by using the reference signal for D2D received from the UE 100-1. Then, when user data is received from the UE 100-1, the UE 100-2 performs demodulation/decoding of the user data on the basis of the channel characteristics estimated by the channel estimation.

In addition, in the case in which the reference signal for D2D is transmitted within the uplink frequency band of the LTE system, the reference signal for D2D may be further used for detecting interference to the uplink communication of the LTE system from the D2D communication.

For example, when the reference signal for D2D is received at a predetermined reception level or more in a radio resource being used in the cellular communication (the uplink communication), the eNB 200 determines that the D2D communication applies interference to the uplink communication, and takes measures for removing the interference with respect to a D2D group identified on the basis of the reference signal for D2D.

Specifically, the eNB 200 changes a radio resource that is assigned to the D2D group or reduces transmission power of the D2D group. In this way, even though the reference signal for D2D applies interference to the cellular communication (the uplink communication), it is possible to remove the interference.

(4.2) Operation Sequence

Figure 12:
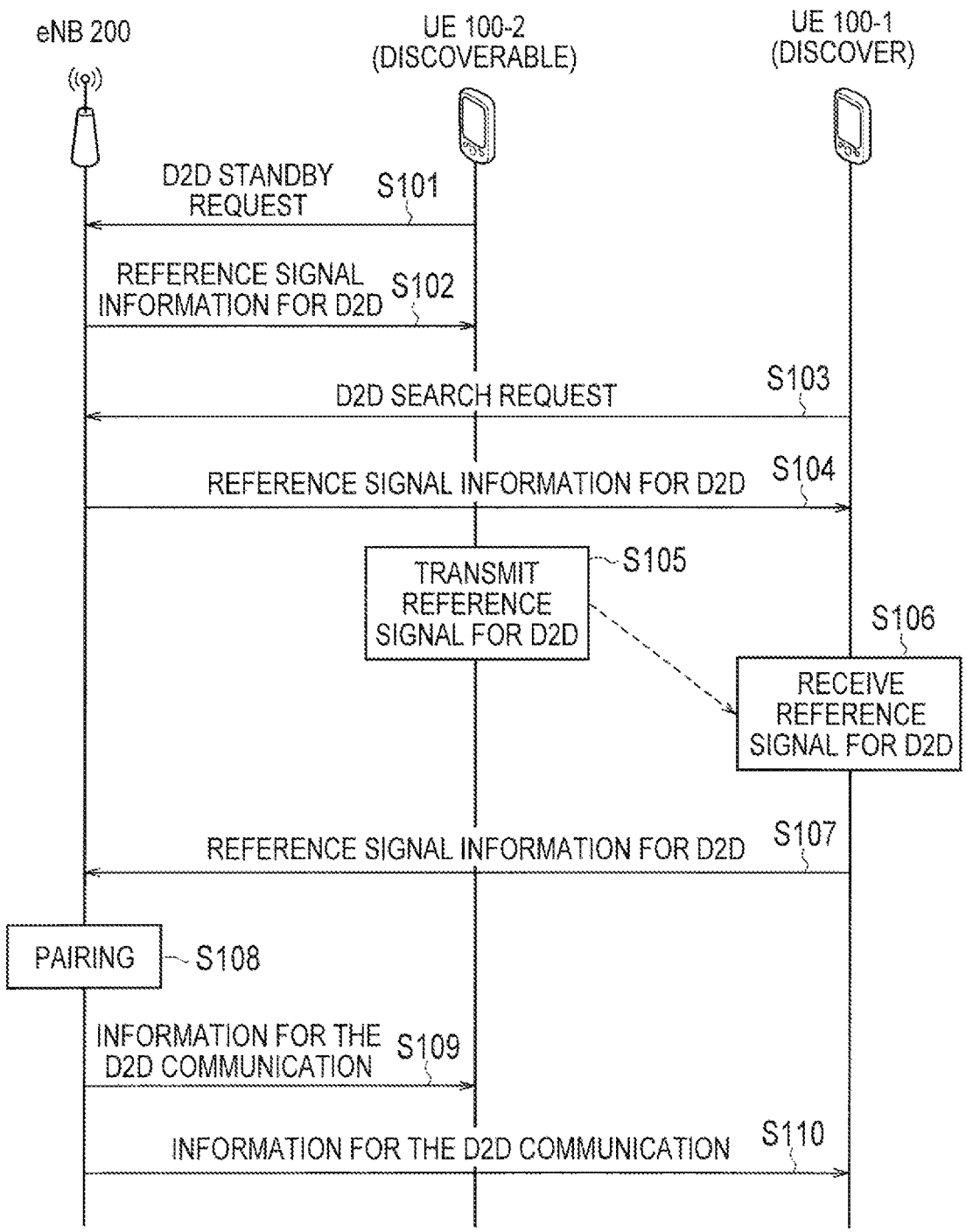
FIG. 12 is a sequence diagram of an operation pattern 1 related to the start of the D2D communication according to a first embodiment.

Next, an operation sequence according to the present embodiment will be described. FIG. 12 is an operation sequence diagram of an operation pattern 1.

As illustrated in FIG. 12, in step S101, the UE 100-2 transmits a D2D standby request for starting standby for the D2D communication to the eNB 200. The D2D standby request may include information indicating the UE 100-2 serving as a transmission source and information indicating the UE 100-1 to be a communication partner of the UE 100-2 in the D2D communication.

In step S102, the eNB 200 transmits, to the UE 100-2, reference signal information for D2D for determining a reference signal parameter of a reference signal for D2D in response to the reception of the D2D standby request from the UE 100-2. The reference signal information for D2D may include D2D group RNTI that is a radio network temporary identifier (RNTI) that differ in each D2D group. In this case, the reference signal parameter of the reference signal for D2D has been correlated in advance with the D2D group RNTI, and the UE 100-2 designates the reference signal parameter correlated with the D2D group RNTI from the eNB 200.

Meanwhile, in step S103, the UE 100-1 transmits, to the eNB 200, a D2D search request for starting search for the D2D communication. For example, the D2D search request may include information indicating the UE 100-1 serving as a transmission source and information indicating the UE 100-2 to be a communication partner of the UE 100-1 in the D2D communication.

In step S104, the eNB 200 transmits, to the UE 100-1, reference signal information for D2D for determining a reference signal parameter of a reference signal for D2D in response to the reception of the D2D search request from the UE 100-1. In addition, similarly to the above, the reference signal information for D2D may include the D2D group RNTI. In this case, the UE 100-1 designates the reference signal parameter correlated with the D2D group RNTI from the eNB 200.

In step S105, the UE 100-2 transmits a reference signal for D2D. Furthermore, a reference signal parameter corresponding to the reference signal information for D2D received from the eNB 200 in step S102 is applied to the reference signal for D2D.

In step S106, the UE 100-1 receives the reference signal for D2D. Furthermore, the UE 100-1 may receive the reference signal for D2D on the basis of the reference signal information for D2D received from the eNB 200 in step S104. Alternatively, the UE 100-1 may also receive the reference signal for D2D by monitoring all receivable reference signals for D2D.

In step S107, in response to the reception of the reference signal for D2D from the UE 100-2, the UE 100-1 transmits, to the eNB 200, reference signal information for D2D indicating that the reference signal for D2D from the UE 100-2 was received (that is, the UE 100-2 was discovered). The reference signal information for D2D may include information indicating the reference signal parameter of the reference signal for D2D received in the UE 100-1.

In step S108, in response to the reception of the reference signal information for D2D from the UE 100-1, the eNB 200 performs correlation (pairing) of the UE 100-1 and the UE 100-2. Then, the eNB 200 assesses that the D2D communication is started between the UE 100-1 and the UE 100-2, and determines a radio resource to be assigned to the D2D communication.

In step S109, the eNB 200 transmits, to the UE 100-2, information for the D2D communication including information indicating the radio resource assigned for the D2D communication and information instructing the start of the D2D communication. The information for the D2D communication may further include information on a modulation and coding scheme (MCS) to be applied to the D2D communication, transmission power, and the like.

In step S110, the eNB 200 transmits, to the UE 100-1, the information for the D2D communication including the information indicating the radio resource assigned for the D2D communication and the information instructing the start of the D2D communication. The information for the D2D communication may further include information on a modulation and coding scheme (MCS) to be applied to the D2D communication, transmission power, and the like.

In addition, the aforementioned D2D group RNTI may be applied to the transmission of the information for the D2D communication. In this case, it is possible to simultaneously transmit the information for the D2D communication to the UE 100-1 and the UE 100-2.

Figure 13:
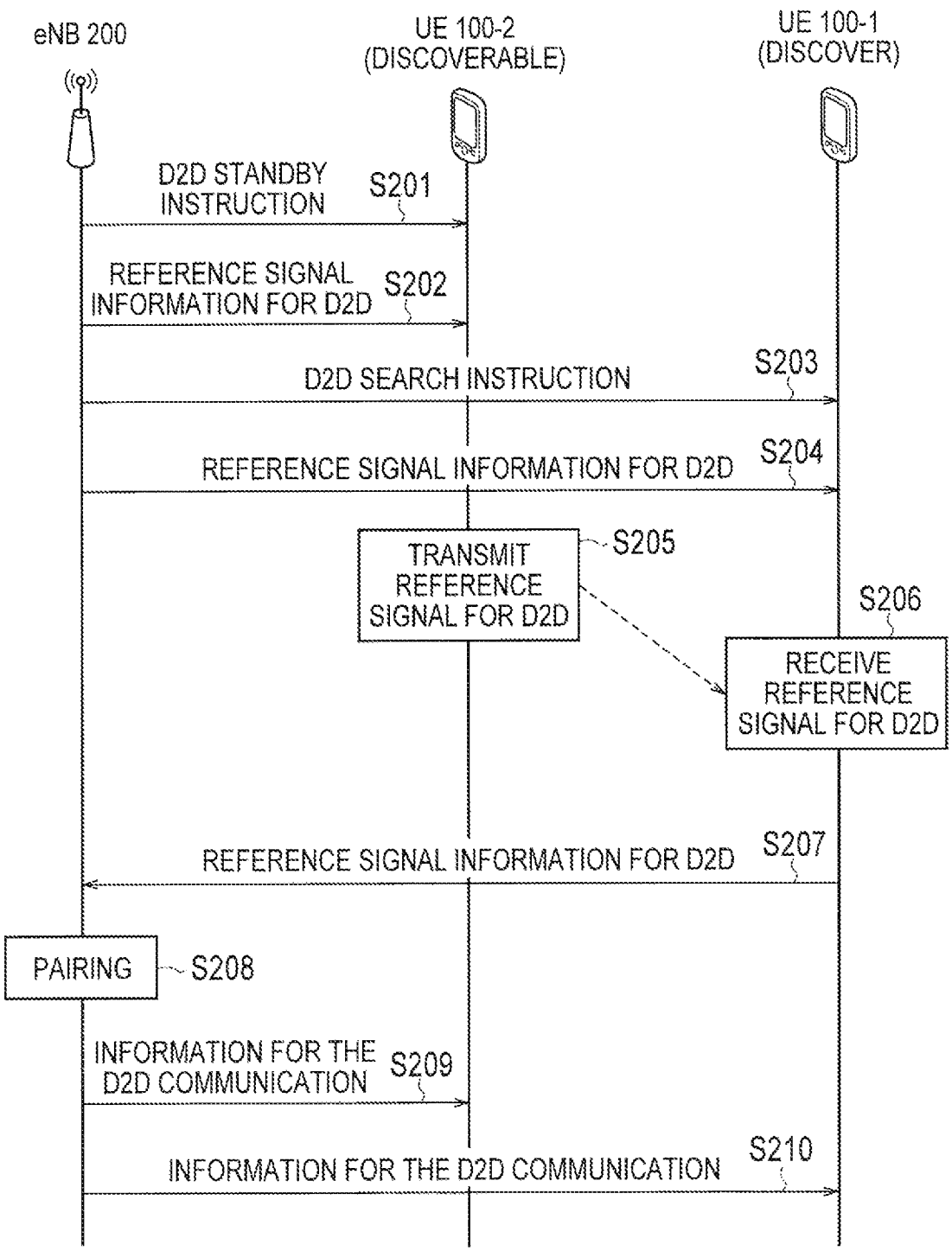
FIG. 13 is a sequence diagram of an operation pattern 2 related to the start of the D2D communication according to a first embodiment.

FIG. 13 is an operation sequence diagram of an operation pattern 2. Since the operation pattern 2 is equal to the operation pattern 1 except for step S201 and step S203, only step S201 and step S203 will be described.

As illustrated in FIG. 13, in step S201, the eNB 200 transmits a D2D standby instruction for instructing the start of standby for the D2D communication to the UE 100-2. The transmission of reference signal information for D2D in step S202 may be performed simultaneously with step S201.

In step S203, the eNB 200 transmits a D2D search instruction for instructing the start of search for the D2D communication to the UE 100-1. The transmission of reference signal information for D2D in step S204 may be performed simultaneously with step S203.

(5) Conclusion

As described above, the LTE system according to the present embodiment newly defines the reference signal for D2D that is used for channel estimation (and demodulation/decoding) in the D2D communication. The reference signal for D2D is further used for discovering another UE 100 that should be a communication partner of the D2D communication. In this way, the reference signal for D2D is made to be common to a beacon signal for discovering the other UE 100, so that it is possible to save a radio resource as compared with the case of defining the beacon signal separately from the reference signal for D2D.

[Second Embodiment]

The second embodiment will be described while focusing on the differences from the first embodiment. The first embodiment has described the case in which, when a reference signal for D2D is received at a predetermined reception level or more in a radio resource being used in the cellular communication (the uplink communication), the eNB 200 determines that the D2D communication applies interference to the uplink communication and takes measures for removing the interference with respect to a D2D group that is identified on the basis of the reference signal for D2D. As such a countermeasure, there was illustrated a case where a radio resource to be assigned to the D2D group is changed, and transmission power of the D2D group is reduced. In the second embodiment, interference between the cellular communication and the D2D communication and a countermeasure for the interference will be described in detail.

Figure 14:
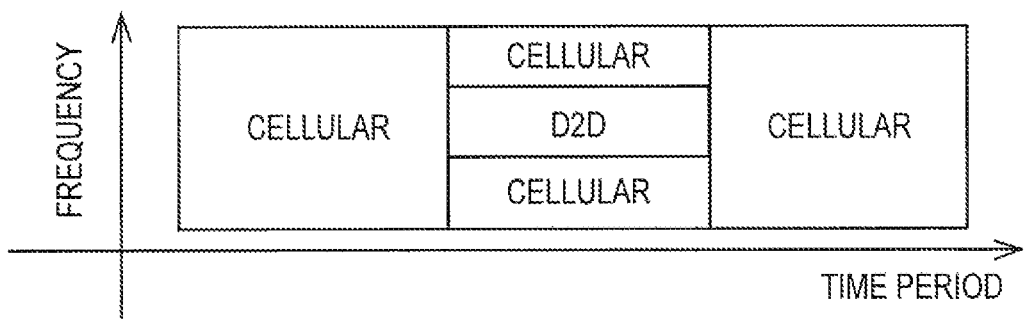
FIG. 14 is a diagram for explaining an operation method (a first operation method) in which a D2D radio resource cannot be used also as the cellular radio resource.

When the D2D communication is performed within a frequency band of the LTE system, in order to ensure a radio resource (a D2D radio resource) to be assigned to the D2D communication, there are the following two operation methods. FIG. 14 is a diagram for explaining a first operation method and FIG. 15 is a diagram for explaining a second operation method.

As illustrated in FIG. 14, according to the first operation method, the D2D radio resource cannot be used also as a radio resource (a cellular radio resource) to be assigned to the cellular communication. In the example of FIG. 14, among radio resources (specifically, time•frequency resources) corresponding to three subframes, several resource blocks positioned at the center in the center subframe are ensured as the D2D radio resource. That is, the D2D radio resource is a radio resource dedicated for the D2D communication. According to the first operation method, it is possible to avoid interference between the cellular communication and the D2D communication; however, there is a problem that the use efficiency of a radio resource is bad because the cellular radio resource is relatively reduced.

Figure 15:
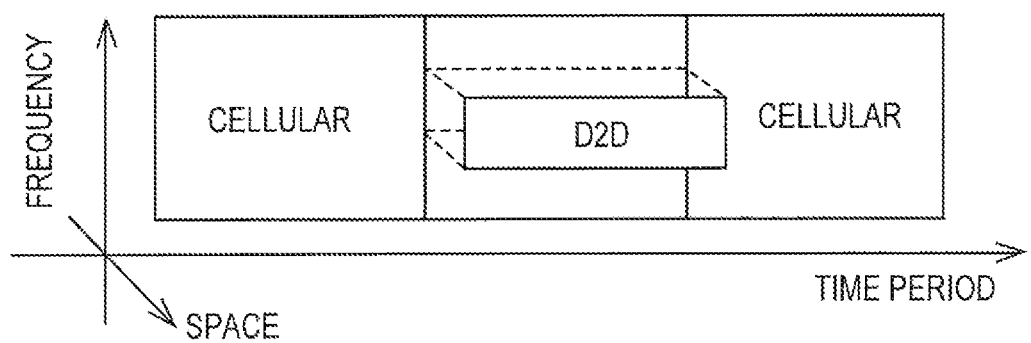
FIG. 15 is a diagram for explaining an operation method (a second operation method) in which a D2D radio resource can be used also as the cellular radio resource.

As illustrated in FIG. 15, according to the second operation method, the D2D radio resource can be used also as the cellular radio resource. In the example of FIG. 15, among radio resources corresponding to three subframes, several resource blocks positioned at the center in the center subframe are also used as the D2D radio resource as well as the cellular radio resource. That is, the D2D radio resource is a radio resource shared with the cellular communication. In this case, the D2D radio resource is spatially separated from the cellular radio resource. According to the second operation method, the use efficiency of a radio resource is high; however, there is a problem that communication quality easily deteriorates because interference occurs between the cellular communication and the D2D communication.

In the present embodiment, based on the operation method (the second operation method) in which the D2D radio resource can be used also as the cellular radio resource, a countermeasure against interference is taken, so that communication quality is prevented from deteriorating while improving the use efficiency of a radio resource.

Hereinafter, a description will be provided for the case, for example, in which the D2D communication is performed within an uplink frequency band of the LTE system.

Figure 16:
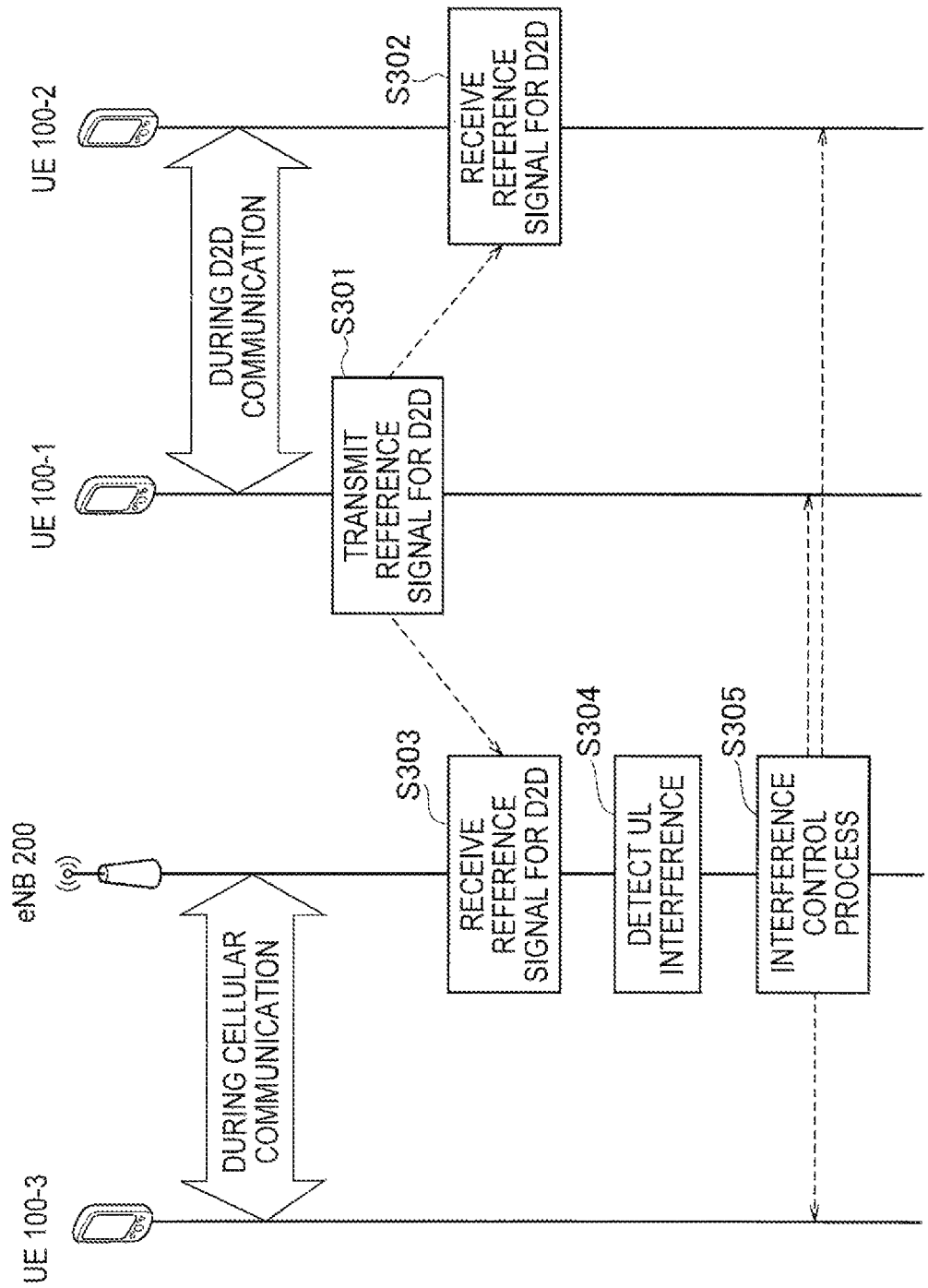
FIG. 16 is an operation sequence diagram according to a second embodiment.

FIG. 16 is an operation sequence diagram according to the present embodiment. In FIG. 16, each of the UE 100-1 and the UE 100-2 is a D2D communication terminal that performs D2D communication by using a D2D radio resource under the control of the eNB 200. The D2D radio resource can be used also as an uplink cellular radio resource (an uplink radio resource). Meanwhile, UE 100-3 is a cellular communication terminal that performs cellular communication under the control of the eNB 200.

As illustrated in FIG. 16, in step S301, the UE 100-1 transmits a reference signal for D2D. As described in the first embodiment, the reference signal for D2D is used for channel estimation between UEs at the time of the D2D communication.

In step S302, the UE 100-2 receives the reference signal for D2D from the UE 100-1. Furthermore, the UE 100-2 performs channel estimation for estimating channel characteristics between the UE 100-2 and the UE 100-1 by using the reference signal for D2D received from the UE 100-1. Then, when user data is received from the UE 100-1, the UE 100-2 performs demodulation/decoding of the user data on the basis of the channel characteristics estimated by the channel estimation.

Furthermore, in step S303, the eNB 200 receives the reference signal for D2D from the UE 100-1. The reference signal for D2D, for example, is transmitted with the same transmission power as that of the D2D communication. Thus, the fact that the eNB 200 receives the reference signal for D2D from the UE 100-1 represents that the UE 100-1 (and the UE 100-2) exists in the vicinity of the eNB 200. In this case, since it is difficult to spatially separate the D2D radio resource from the uplink radio resource, interference occurs in an uplink of the cellular communication.

In step S304, the eNB 200 detects interference in the uplink on the basis of the reference signal for D2D received from the UE 100-1. For example, when the reference signal for D2D is received at a predetermined reception level or more (namely, when a reception level of the D2D communication is higher than a threshold value), the eNB 200 determines that the D2D communication applies interference to the uplink communication. Furthermore, the eNB 200 identifies a D2D group (the UE 100-1 and the UE 100-2) on the basis of the reference signal for D2D.

In step S305, the eNB 200 which detected the uplink interference on the basis of the reference signal for D2D performs an interference control process for solving or reducing the interference. In other words, the eNB 200 performs the interference control process in response to the reference signal for D2D received at the predetermined reception level or more. In the present embodiment, the eNB 200 performs at least one of the following first to fifth interference control processes.

In the first interference control process, the eNB 200 transmits switching information for switching the D2D communication to the cellular communication to the UE 100-1 (and/or the UE 100-2). The eNB 200 may transmit the switching information to both the UE 100-1 and the UE 100-2, or may transmit the switching information to only one UE 100 and the one UE 100 may transfer the switching information to the other UE 100. As a consequence, the UE 100-1 and the UE 100-2 switch the D2D communication to the cellular communication. In addition, the UE 100-1 and the UE 100-2 may switch to the cellular communication while maintaining a connection to the eNB 200, or may switch to the cellular communication by reconnecting to the eNB 200.

In the second interference control process, the eNB 200 performs scheduling (resource assignment change) such that a radio resource is not shared between the D2D communication and the uplink.

For example, the eNB 200 performs scheduling to assign, to the UE 100-1 and the UE 100-2, a radio resource (that is, a radio resource dedicated for D2D) not shared with the uplink as a radio resource (a D2D radio resource) to be used in the D2D communication. In the case of employing the first assignment scheme described in the first embodiment, the eNB 200 may notify the UE 100 having a resource determination right of the UE 100-1 and the UE 100-2 of the radio resource dedicated for D2D as an assignment candidate radio resource. In the case of employing the second assignment scheme described in the first embodiment, the eNB 200 may determine a radio resource to be assigned to the UE 100-1 and the UE 100-2 from radio resources ensured as the radio resource dedicated for D2D, and may notify the UE 100-1 and the UE 100-2 of the determined radio resource. As a consequence, the UE 100-1 and the UE 100-2 perform the D2D communication in the radio resource dedicated for D2D.

Alternatively, the eNB 200 may perform scheduling to assign a radio resource, which is not shared with the D2D communication by the UE 100-1 and the UE 100-2, as a radio resource to be used in the uplink communication by the UE 100-3.

In the third interference control process, the eNB 200 transmits power control information for reducing transmission power in the D2D communication to the UE 100-1 (and/or the UE 100-2). The power control information may be information for directly designating a value of the transmission power, or information for designating a variation based on current transmission power. Furthermore, the eNB 200 may transmit the power control information to both the UE 100-1 and the UE 100-2, or may transmit the power control information to only one UE 100 and the one UE 100 may transfer the power control information to the other UE 100. As a consequence, the UE 100-1 and the UE 100-2 reduce the transmission power in the D2D communication.

In the fourth interference control process, the eNB 200 transmits, to the UE 100-3, power control information for increasing uplink transmission power or MCS control information for reducing uplink MCS (Modulation and Coding Scheme). The power control information may be information for directly designating a value of the transmission power, or information for designating a variation based on current transmission power. In this way, the transmission power is increased, resulting in an increase in resistance to interference. The MCS control information is information indicating the changed MCS. In addition, the "reducing the MCS" indicates a change to MCS with a data rate (that is, MCS with high resistance to interference) lower than that of current MCS. As a consequence, the UE 100-3 changes the transmission power or the MCS.

The fifth interference control process is applicable to the case in which the UE 100-1 and the UE 100-2 perform multi-antenna transmission in the D2D communication. The eNB 200 transmits, to the UE 100-1, setting information for setting an antenna weight by which interference applied to the eNB 200 is reduced. The antenna weight is called a precoder (or a precoder matrix). For example, the eNB 200 receives a reference signal for D2D from the UE 100-1, performs channel estimation, derives an antenna weight, by which null is directed toward the eNB 200, on the basis of a result of the channel estimation, and transmits setting information indicating the derived antenna weight to the UE 100-1. The same setting process is also performed for the UE 100-2. Alternatively, as well as the case in which the eNB 200 derives the antenna weight, setting information for instructing the derivation of the antenna weight, by which null is directed toward the eNB 200, may be transmitted from the eNB 200 to the UE 100-1 and the UE 100-2. As a consequence, the UE 100-1 and the UE 100-2 perform the D2D communication by using a directional pattern by which interference is reduced.

[Third Embodiment]

The third embodiment will be described while focusing on the differences from the second embodiment. The second embodiment has described the case in which, when the eNB 200 detects interference from the D2D communication terminal performing the D2D communication, the eNB 200 performs the interference control process. In the third embodiment, a case in which a D2D communication terminal has received interference from a cellular communication terminal performing the cellular communication will be described in detail.

(Operation According to the Third Embodiment)

Next, an operation according to the present embodiment will be described.

Figure 17:
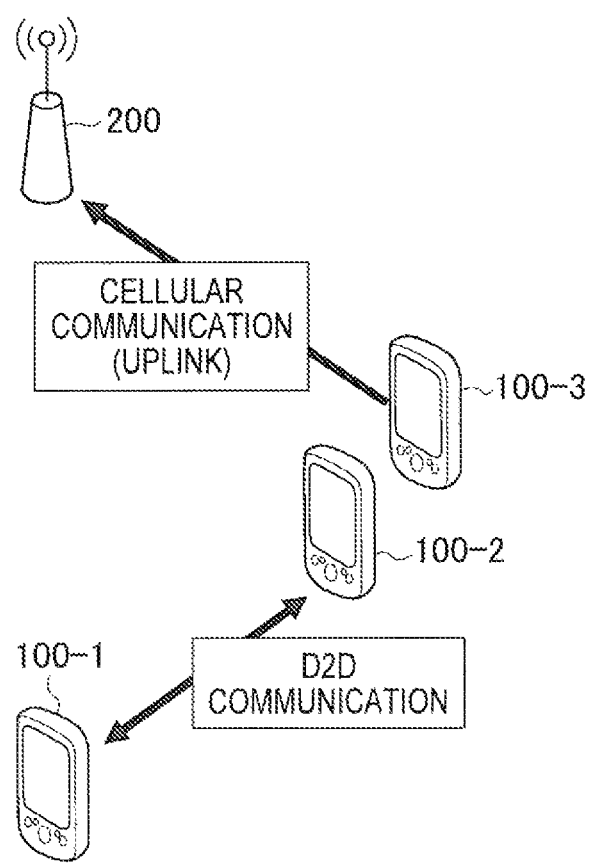
FIG. 17 is a diagram for explaining a communication environment according to a third embodiment.

FIG. 17 is a diagram for explaining a communication environment according to the present embodiment. In the present embodiment, a communication environment, in which the cellular communication and the D2D communication are simultaneously performed, is considered.

As illustrated in FIG. 17, the UE 100-1 and the UE 100-2 perform the D2D communication by using a D2D resource that is assigned from the eNB 200. In the present embodiment, each of the UE 100-1 and the UE 100-2 corresponds to the D2D communication terminal.

On the other hand, UE 100-3 performs the cellular communication with the eNB 200 by using a D2D resource that is assigned from the eNB 200. In the present embodiment, the UE 100-3 corresponds to the cellular communication terminal.

As described above, in the case in which the D2D communication is performed by using a part of an uplink radio resource of the cellular communication and both the D2D communication and the cellular communication are simultaneously performed, the uplink of the cellular communication may apply interference to the D2D communication.

In this regard, in response to the detection of interference power, the D2D communication terminals (the UE 100-1 and the UE 100-2) transmit D2D interference information on the interference to the eNB 200. In this way, the eNB 200 is able to recognize the generation of the interference which the D2D communication terminal receives (particularly, interference from the uplink of the cellular communication), and to take measures for solving the interference.

In addition, the D2D communication terminal is able to recognize the generation of the interference and to take measures for solving the interference, when a connection (D2D connection) used by transmitting and receiving data (control data or user data) in the D2D communication with another D2D communication terminal is established. Thus, the D2D communication terminal may recognize the generation of the interference and to take measures for solving the interference not only when the D2D communication terminal is performing the transmitting and receiving data (that is, a narrowly-defined D2D communication), but also when the D2D communication terminal is not performing the transmitting and receiving data (that is, a broadly-defined D2D communication) while the D2D connection is established.

When a value of the interference power is higher than a threshold value, the D2D communication terminal transmits the D2D interference information to the eNB 200. In this way, it is possible to ensure that the eNB 200 is notified of the generation of high level of interference and the eNB 200 is not notified of non-problematic level of interference.

Furthermore, the D2D communication terminal may detect interference power for a reference signal (DMRS and SRS) in the uplink of the cellular communication. In this way, it is possible to more reliably detect interference from the cellular communication.

In the present embodiment, the D2D communication terminal transmits the D2D interference information to the eNB 200 at the timing after a predetermined time (for example, four subframes) lapses from the detection timing of the interference power. In this case, the D2D interference information is information indicating that the terminal has received interference.

Furthermore, the eNB 200 manages the history of radio resource assignment (resource assignment history) in the D2D communication and the cellular communication. When the eNB 200 receives the D2D interference information from the D2D communication terminal, the eNB 200 estimates the UE 100 being an interference source on the basis of the reception timing of the D2D interference information and the resource assignment history. In this way, the eNB 200 is able to designate the interference generation timing from the reception timing of the D2D interference information, and to estimate the UE 100 being the interference source from the resource assignment history at the interference generation timing.

Figure 18:
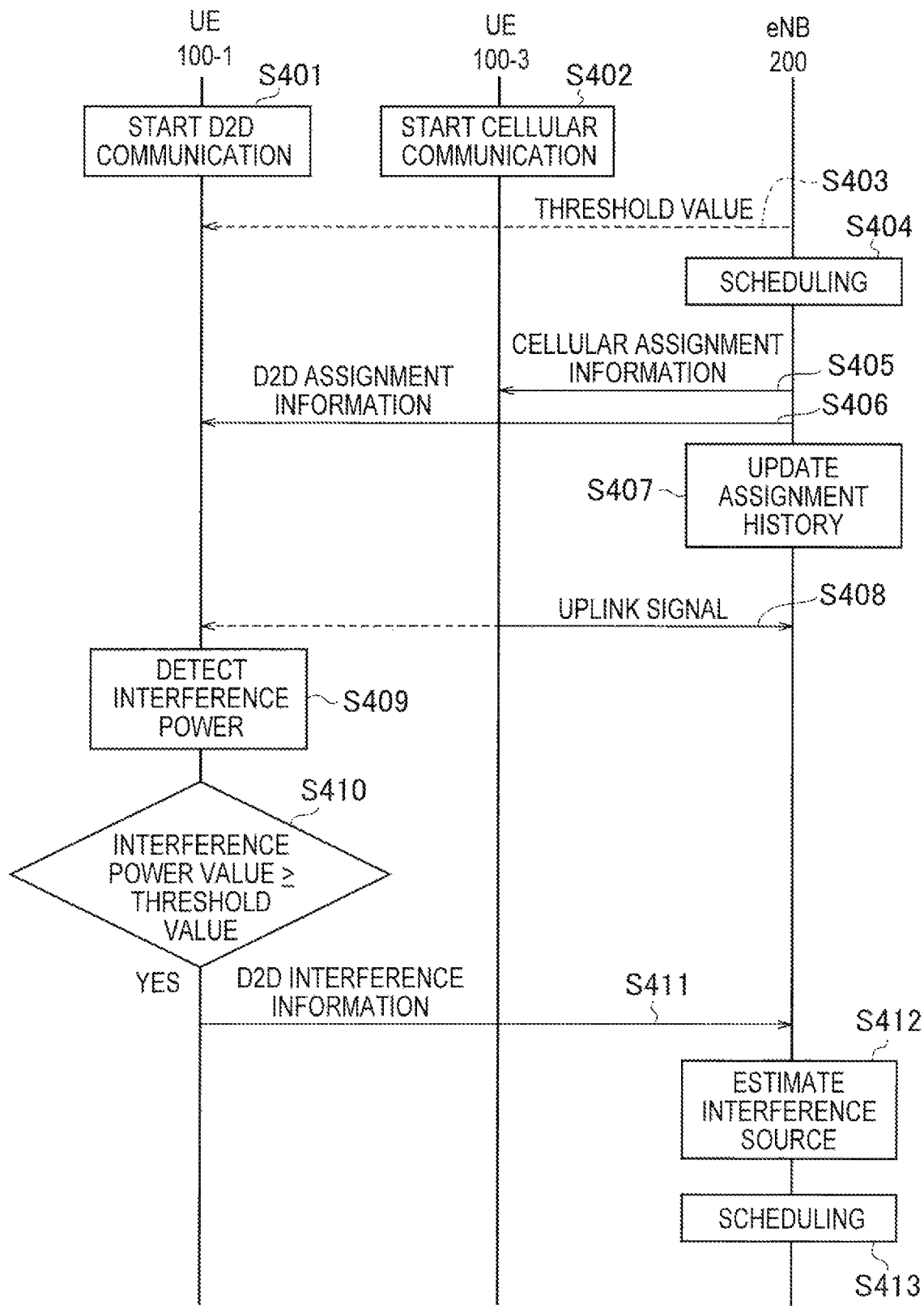
FIG. 18 is an operation sequence diagram according to the third embodiment.

FIG. 18 is an operation sequence diagram according to the present embodiment. Hereinafter, the UE 100-1 of the D2D communication terminals will be described as an example.

As illustrated in FIG. 18, in step S401, the UE 100-1 starts D2D communication. In step S402, the UE 100-3 starts cellular communication.

In step S403, the eNB 200 transmits a threshold value for defining a transmission trigger of D2D interference information to the UE 100-1. The transmission may be performed in a unicast manner or a broadcast manner. In addition, when the UE 100-1 stores the threshold value in advance, the transmission of the threshold value may be omitted. Furthermore, the eNB 200 may also transmit, to the UE 100-1, timing information indicating the timing at which interference power is to be monitored by the UE 100-1, and/or signal sequence information indicating a reference signal sequence to be monitored.

In step S404, the eNB 200 performs scheduling of a radio resource. Specifically, the eNB 200 determines a D2D resource to be assigned to the D2D communication by the UE 100-1 and the UE 100-2 in a predetermined subframe. Furthermore, the eNB 200 determines a radio resource to be assigned to the cellular communication (an uplink) by the UE 100-3. Specifically, in uplink scheduling, the eNB 200 determines an assignment resource block to the UE 100-3 after four subframes. In addition, the eNB 200 may perform scheduling of each of the D2D communication and the cellular communication at different timings.

In step S405, the eNB 200 transmits, to the UE 100-3, cellular assignment information indicating the radio resource assigned to the cellular communication (the uplink) by the UE 100-3.

In step S406, the eNB 200 transmits, to the UE 100-1, D2D assignment information indicating the D2D resource assigned to the D2D communication by the UE 100-1 and the UE 100-2.

After the UE 100-1 receives the D2D assignment information, the UE 100-1 performs the D2D communication by using the D2D resource indicated by the D2D assignment information in the predetermined subframe.

In step S407, the eNB 200 updates resource assignment history that is a history of an assignment state of a radio resource (a resource block) of each subframe. The resource assignment history is information managed by the eNB 200. The eNB 200 manages resource assignment history corresponding to at least four subframes.

FIG. 19 is a diagram for explaining a detailed example of the resource assignment history according to the present embodiment.

As illustrated in FIG. 19, the resource assignment history is obtained by recording an assignment resource bock of each subframe with respect to each UE 100. For the UE 100-3, a resource block that is assigned as PUSCH is exemplified. However, when interference is detected on the basis of a reference signal (DMRS and SRS), it is sufficient if a resource bock assigned as a reference signal resource (a DMRS resource and an SRS resource) is recorded.

Returning to FIG. 18, in step S408, the UE 100-3 transmits an uplink signal by using a resource block indicated by the cellular assignment information after the cellular assignment information is received in step S405 and four subframes pass. The uplink signal includes user data and a reference signal.

Hereinafter, the following description will be given on the assumption that the UE 100-1 received the uplink signal from the UE 100-3.

In step S409, the UE 100-1 detects interference power during the D2D communication. Furthermore, the UE 100-1 measures a value of the interference power (an interference power value). In addition, when the UE 100-1 has received, from the eNB 200, the timing information indicating the timing at which interference power is to be monitored and/or the signal sequence information indicating a reference signal sequence to be monitored, the UE 100-1 detects interference on the base of the received information.

In step S410, the UE 100-1 compares the interference power value measured in step S409 with a threshold value. The threshold value may be a threshold value designated from the eNB 200 in step S403. Hereinafter, the following description will be given on the assumption that the interference power value measured in step S409 is equal to or more than the threshold value.

In step S411, the UE 100-1 transmits D2D interference information to the eNB 200 at the timing after a predetermined time (for example, four subframes) lapses from the detection timing (step S409) of the interference power. The UE 100-1 is able to transmit the D2D interference information through PUCCH other than a radio resource clearly assigned from the eNB 200. Furthermore, a parameter indicating a candidate of the radio resource is designated from the eNB 200, but is notified in a contention-based manner. In this case, the D2D interference information is information indicating that the terminal has received interference.

Furthermore, the D2D interference information may include information indicating a frequency (a resource block) at which interference power was detected. Furthermore, when interference is detected on the basis of the reference signal (DMRS and SRS), the D2D interference information may also include information indicating a signal sequence (an orthogonal sequence) of the reference signal or information generated from the signal sequence of the reference signal. The information generated from the signal sequence of the reference signal is, for example, a parameter(s) for generation of the signal sequence of the reference signal. The parameter itself does not indicate the signal sequence of the reference signal. For example, the signal sequence of the reference signal is generated by combining the parameter with a known cell ID or the like.

In step S412, the eNB 200 estimates UE 100 being an interference source on the basis of the D2D interference information received from the UE 100-1 and the managed resource assignment history. For example, before a predetermined time (for example, four subframes) at which the D2D interference information is received, the eNB 200 estimates UE 100, to which the same resource block as that of the UE 100-1 was assigned, as the interference source.

Hereinafter, the following description will be given on the assumption that the UE 100-3 was estimated as the interference source. In this case, it is possible to determine that the UE 100-3 exists in the vicinity of the UE 100-1.

Accordingly, the eNB 200 performs the following scheduling (step S413) such that different radio resources are assigned to the UE 100-1 and the UE 100-3.

In this way, the eNB 200 is able to recognize the generation of interference (particularly, interference from the cellular communication) which the D2D communication terminal has received, and to take measures for solving the interference. Consequently, it is possible to allow the D2D communication to be compatible with the cellular communication.

In the aforementioned operation sequence, based on the operation method (the second operation method described in the second embodiment (in reference to FIG. 15)) in which the D2D radio resource can be used also as the cellular radio resource, as illustrated in FIG. 18, the eNB 200 performs re-scheduling (step S413) of allowing a radio resource to be assigned to the D2D communication terminal (the UE 100-1) to differ from a radio resource to be assigned to the cellular communication terminal (the UE 100-3) being the interference source in response to the reception (step S411) of the D2D interference information from the D2D communication terminal. However, as well as an interference control method (a first interference control method) based on the scheduling, the following interference control methods (a second interference control method to a fifth interference control method) may be employed.

In the second interference control method, in response to the reception of the D2D interference information from the D2D communication terminal (the UE 100-1), the eNB 200 transmits switching information for switching the D2D communication to the cellular communication to the D2D communication terminal (the UE 100-1 and/or the UE 100-2). The eNB 200 may transmit the switching information to both the UE 100-1 and the UE 100-2, or may transmit the switching information to only one UE 100 and the one UE 100 may transfer the switching information to the other UE 100. As a consequence, the UE 100-1 and the UE 100-2 switch the D2D communication to the cellular communication. In addition, the UE 100-1 and the UE 100-2 may switch to the cellular communication while maintaining a connection to the eNB 200, or may switch to the cellular communication by reconnecting to the eNB 200.

In the third interference control method, in response to the reception of the D2D interference information from the D2D communication terminal (the UE 100-1), the eNB 200 transmits, to the D2D communication terminal (the UE 100-1 and/or the UE 100-2), power control information for increasing transmission power in the D2D communication or MCS control information for reducing MCS in the D2D communication. The power control information may be information for directly designating a value of the transmission power, or information for designating a variation based on current transmission power. In this way, the transmission power is increased, resulting in an increase in resistance to interference. The MCS control information is information indicating the changed MCS. In addition, the "reducing the MCS" indicates a change to MCS with a data rate (that is, MCS with high resistance to interference) lower than that of current MCS. As a consequence, the D2D communication terminal increases the transmission power in the D2D communication or reduces the MCS in the D2D communication, thereby continuing the D2D communication.

In the fourth interference control method, in response to the reception of the D2D interference information from the D2D communication terminal (the UE 100-1), the eNB 200 transmits power control information for reducing uplink transmission power to the cellular communication terminal (the UE 100-3). The power control information may be information for directly designating a value of the transmission power, or information for designating a variation based on current transmission power. The cellular communication terminal (the UE 100-3) reduces the transmission power, thereby decreasing interference applied to the D2D communication terminal.

The fifth interference control method is applicable to the case in which the cellular communication terminal (the UE 100-3) performs multi-antenna transmission in an uplink. In response to the reception of the D2D interference information from the D2D communication terminal (the UE 100-1), the eNB 200 transmits, to the cellular communication terminal (the UE 100-3), setting information for setting an antenna weight by which interference applied to the D2D communication is reduced. The antenna weight is called a precoder (or a precoder matrix). For example, the D2D communication terminal (the UE 100-1 and/or the UE 100-2) receives a reference signal from the cellular communication terminal (the UE 100-3), performs channel estimation, and notifies the eNB 200 of a channel estimation result. On the basis of the notified channel estimation result, the eNB 200 transmits, to the cellular communication terminal (the UE 100-3), setting information for setting an antenna weight by which interference applied to the D2D communication is reduced. Alternatively, the D2D communication terminal (the UE 100-1 and/or the UE 100-2) selects an antenna weight, by which interference power from the cellular communication terminal (the UE 100-3) is reduced, from candidates (code books) of an antenna weight, and notifies the eNB 200 of information (BCI: Best Companion PMI) indicating the selected antenna weight. On the basis of the notified information, the eNB 200 transmits, to the cellular communication terminal (the UE 100-3), setting information for setting an antenna weight by which interference applied to the D2D communication is reduced. As a consequence, the cellular communication terminal (the UE 100-3) performs uplink communication by using a directional pattern by which interference to the D2D communication terminal is reduced.

[Modification of Third Embodiment]

In the aforementioned third embodiment, the UE 100-1 transmits D2D interference information to the eNB 200 at the timing after a predetermined time (for example, four subframes) lapses from the detection timing of interference power, even by using a radio resource other than that assigned from the eNB 200.

On the other hand, in the present modification, the UE 100-1 transmits the D2D interference information to the eNB 200 by using the radio resource assigned from the eNB 200. In this case, as compared with the aforementioned embodiment, it is possible to increase the amount of information to be included in the D2D interference information.

In the present modification, the D2D interference information includes timing information indicating the detection timing of the interference power. When the eNB 200 receives the D2D interference information from the UE 100-1, the eNB 200 estimates UE 100 being an interference source on the basis of the timing information included in the D2D interference information and the resource assignment history.

Moreover, the D2D interference information may include information indicating a frequency (a resource block) at which interference power was detected. Furthermore, when interference is detected on the basis of the reference signal (DMRS and SRS), the D2D interference information may also include information indicating a signal sequence (an orthogonal sequence) of the reference signal or information generated from the signal sequence of the reference signal.

[Fourth Embodiment]

Hereinafter, the fourth embodiment will be described while focusing on the differences from the third embodiment. The aforementioned third embodiment has described detection of interference between the cellular communication and the D2D communication, and interference control for the interference. However, the operation described in the first embodiment is applicable to detection of interference caused between the D2D communication and the D2D communication and to interference control for the interference.

Figure 20:
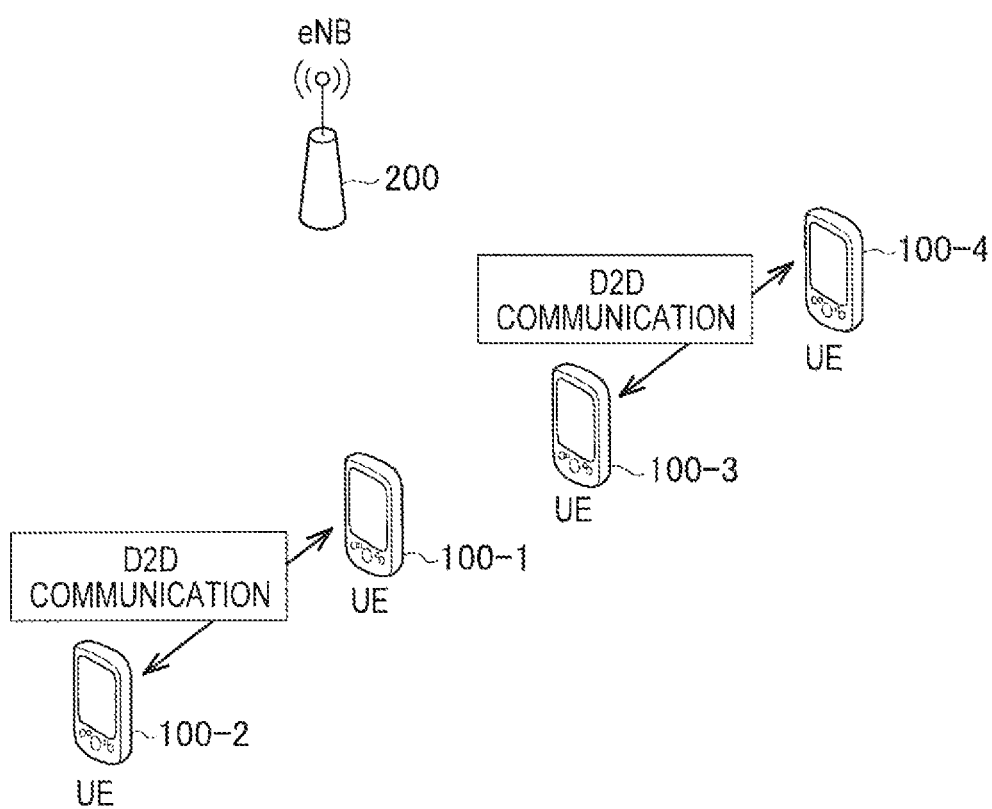
FIG. 20 is a diagram for explaining a communication environment according to a fourth embodiment.

FIG. 20 is a diagram for explaining a communication environment according to the present embodiment. The present embodiment considers a communication environment in which the D2D communication is simultaneously performed by different D2D groups in the same cell.

As illustrated in FIG. 20, UE 100-1 and UE 100-2 (a D2D group 1) perform the D2D communication by using a D2D resource that is assigned from the eNB 200. Furthermore, UE 100-3 and UE 100-4 (a D2D group 2) perform the D2D communication by using a D2D resource that is assigned from the eNB 200. As described above, in the present embodiment, all of the UE 100-1 to the UE 100-4 are D2D communication terminals.

Furthermore, in the case in which the D2D resource is shared between the D2D group 1 and the D2D group 2 and the D2D group 1 and the D2D group 2 are adjacent to each other (that is, path loss is small), the D2D group 1 and the D2D group 2 may apply interference to each other.

Similarly to the third embodiment, in response to the detection of interference power, the D2D communication terminal transmits D2D interference information on the interference to the eNB 200. In this way, the eNB 200 is able to recognize the generation of the interference which the D2D communication terminal receives. A basic operation is the same as that in the third embodiment. Specifically, the "cellular communication terminal" in the third embodiment is replaced with a "D2D communication terminal of a separate D2D group", so that it is possible to cope with interference between the D2D communication and the D2D communication.

Furthermore, in the present embodiment, in order to detect interference, it is possible to apply a reference signal for D2D instead of an uplink reference signal. The D2D communication terminal transmits a reference signal for D2D to be used in channel estimation in the D2D communication. Furthermore, the reference signal for D2D may be used for discovering another UE 100 to be a communication partner of the D2D communication. A reference signal parameter, which differs in each D2D group, is applied to the reference signal for D2D. The reference signal parameter is designated from the eNB 200. The reference signal for D2D may be transmitted using a resource element common in each of the D2D groups. In this case, the reference signal parameter, for example, may be an orthogonal code for performing code division multiplexing on the reference signal for D2D. When a resource element, in which the reference signal for D2D is arranged, is allowed to differ in each D2D group, the resource element corresponds to the reference signal parameter. Alternatively, when a subframe, in which the reference signal for D2D is arranged, is differed in each D2D group, the subframe corresponds to the reference signal parameter. Furthermore, in the case in which the reference signal for D2D is transmitted within the uplink frequency band of the LTE system, the reference signal for D2D is arranged while avoiding a physical uplink control channel (PUCCH), a demodulation reference signal (DMRS), and a sounding reference signal (SRS) within the uplink frequency band.

Furthermore, in the present embodiment, the D2D communication terminal (for example, the UE 100-1) transmits D2D interference information to the eNB 200 in response to the detection of interference power from another D2D communication terminal (for example, the UE 100-3) which is not a communication partner of the D2D communication terminal. The D2D communication terminal detects interference power for the reference signal for D2D. Alternatively, the D2D communication terminal may detect interference power for a beacon signal for D2D.

In the case of detecting the interference power for the reference signal for D2D, the D2D interference information includes information indicating a reference signal parameter of the reference signal for D2D (a signal sequence of the reference signal, information generated from the signal sequence of the reference signal and the like). As described above, since the reference signal parameter, which differs in each D2D group, is applied to the reference signal for D2D, the eNB 200 is able to identify a D2D communication terminal (a D2D group) being an interference source. Furthermore, as well as such an interference source identification method, it may be possible to employ an interference source identification method based on the resource assignment history similarly to the third embodiment.

Next, interference control methods according to the present embodiment will be described by considering the case in which the D2D communication terminal (the UE 100-1 and/or the UE 100-2) belonging to the D2D group 1 detected interference from the D2D communication terminal (the UE 100-3 and/or the UE 100-4) belonging to the D2D group 2. Furthermore, a description of the same operation as that of the first embodiment will be omitted.

In a first interference control method, in response to the reception of D2D interference information from the D2D communication terminal (the UE 100-1 and/or the UE 100-2), the eNB 200 transmits switching information for switching the D2D communication to the cellular communication to the D2D communication terminal (the UE 100-1 and/or the UE 100-2) or the D2D communication terminal (the UE 100-3 and/or the UE 100-4) being an interference source.

In a second interference control method, in response to the reception of D2D interference information from the D2D communication terminal (the UE 100-1 and/or the UE 100-2), the eNB 200 allows a radio resource to be assigned to the D2D communication terminal (the UE 100-1 and/or the UE 100-2) to differ from a radio resource to be assigned to the D2D communication terminal (the UE 100-3 and/or the UE 100-4) being as an interference source.

In a third interference control method, in response to the reception of D2D interference information from the D2D communication terminal (the UE 100-1 and/or the UE 100-2), the eNB 200 transmits power control information for reducing transmission power or MCS control information for reducing MCS to the D2D communication terminal (the UE 100-1 and/or the UE 100-2) and/or the D2D communication terminal (the UE 100-3 and/or the UE 100-4) being an interference source.

In a fourth interference control method, in response to the reception of D2D interference information from the D2D communication terminal (the UE 100-1 and/or the UE 100-2), the eNB 200 transmits setting information for setting an antenna weight, by which interference is reduced, to the D2D communication terminal (the UE 100-1 and/or the UE 100-2) and/or the D2D communication terminal (the UE 100-3 and/or the UE 100-4) being an interference source.

[Other Embodiments]

Thus, the present disclosure has been described with the embodiment. However, it should not be understood that those descriptions and drawings constituting a part of the present disclosure limit the present disclosure. From this disclosure, a variety of alternate embodiments, examples, and applicable techniques will become apparent to one skilled in the art.

For example, the aforementioned first embodiment describes the case in which the D2D communication is performed in the uplink frequency band or the downlink frequency band. However, the D2D communication may be performed in a frequency band (a component carrier for D2D communication) for D2D communication.

For example, in the aforementioned third and fourth embodiments, the FDD scheme is considered as the duplex scheme. However, the TDD scheme may be used as the duplex scheme.

Furthermore, the aforementioned third and fourth embodiments describe an example in which the D2D communication is performed using a part of the uplink radio resource of the cellular communication. However, the D2D communication may be performed using a part of a downlink radio resource of the cellular communication.

Furthermore, in the aforementioned second and fourth embodiments, the reference signal for D2D may be used for only detecting interference. The reference signal for D2D may be used not only used for only detecting interference, but also for discovering another UE 100 to be a communication partner of the D2D communication.

In addition, the entire contents of U.S. Provisional Application No. 61/676,770 (filed on Jul. 27, 2012), U.S. Provisional Application No. 61/705,882 (filed on Sep. 26, 2012), U.S. Provisional Application No. 61/759,024 (filed on Jan. 31, 2013) and U.S. Provisional Application No. 61/759,035 (filed on Jan. 31, 2013) are incorporated in the present specification by reference.

INDUSTRIAL APPLICABILITY

As described above, the present disclosure according to a mobile communication system, a user terminal, a processor and a base station is capable of appropriately controlling D2D communication, and thus is available for a mobile communication field.

The invention claimed is:

1. A communication system, comprising:
a first communication terminal;
a second communication terminal being not a communication partner of the first communication terminal; and
a base station, wherein
the base station transmits information to the first communication terminal and the second communication terminal, wherein the information indicates candidate radio resources being radio resources available for direct communication between terminals,
the first communication terminal autonomously selects radio resources to be used in the direct communication, from among the candidate radio resources,
the first communication terminal performs the direct communication by use of the selected radio resources,
the second communication terminal autonomously selects radio resources to be used in the direct communication, from among the candidate radio resources,
the second communication terminal performs the direct communication by use of the selected radio resources,
the first communication terminal detects received power after receiving the information indicating the candidate radio resources, wherein the received power is detected, by the first communication terminal, on the basis of a reference signal for the direct communication transmitted by the second communication terminal, the reference signal for the direct communication being different from an uplink signal addressed to the base station, and
the first communication terminal transmits identification information identifying resource blocks belonging to a subset of the candidate radio resources to the base station in response to a value associated with the received power detected in the subset being higher than a threshold value.

2. The communication system according to claim 1, wherein the threshold value is designated from the base station.

3. A first communication terminal, comprising:
a receiver;
a transmitter; and
a controller including a processor and a memory configured to communicatively couple to the processer, wherein
the receiver is configured to receive information from a base station, wherein the information indicates candidate radio resources being radio resources available for direct communication between terminals,
the controller is configured to:
autonomously select radio resources to be used in the direct communication, from among the candidate radio resources;
perform the direct communication by use of the selected radio resources; and
detect received power after receiving the information indicating the candidate radio resources, wherein the received power is detected, by the first communication terminal, on the basis of a reference signal for the direct communication transmitted by a second communication terminal, the reference signal for the direct communication being different from an uplink signal addressed to the base station, and
the transmitter is configured to transmit identification information identifying resource blocks belonging to a subset of the candidate radio resources to the base station in response to a value associated with the received power detected in the subset being higher than a threshold value.

4. An apparatus for controlling a first communication terminal, comprising:
a processor; and
a memory communicatively coupled to the processor and including instructions such that when executed by the processor performs processes of:
receiving information from a base station, wherein the information indicates candidate radio resources being radio resources available for direct communication between terminals;
autonomously selecting radio resources to be used in the direct communication, from among the candidate radio resources;
performing the direct communication by use of the selected radio resources;
detecting received power after receiving the information indicating the candidate radio resources, wherein the received power is detected, by the first communication terminal, on the basis of a reference signal for the direct communication transmitted by a second communication terminal, the reference signal for the direct communication being different from an uplink signal addressed to the base station; and transmitting identification information identifying resource blocks belonging to a subset of the candidate radio resources to the base station in response to a value associated with the received power detected in the subset being higher than a threshold value.

5. A base station, comprising:

a transmitter;

a receiver; and a controller including a processor and a memory configured to communicatively couple to the processer, wherein the transmitter is configured to transmit information to a first communication terminal and a second communication terminal, wherein the information indicates candidate radio resources being radio resources available for direct communication between terminals and used for the first communication terminal and the second communication terminal to autonomously select radio resources to be used in the direct communication, from among the candidate radio resources, and the receiver is configured to receive identification information identifying resource blocks belonging to a subset of the candidate radio resources from the first communication terminal in response to a value associated with received power detected in the subset being higher than a threshold value, after transmitting the information indicating the candidate radio resources, wherein the received power is detected, by the first communication terminal, on the basis of a reference signal for the direct communication transmitted by the second communication terminal, the reference signal for the direct communication being different from an uplink signal addressed to the base station, and wherein the threshold value is designated by the base station.

* * * * *